US006587739B1

(12) United States Patent
Abrams et al.

(10) Patent No.: US 6,587,739 B1
(45) Date of Patent: Jul. 1, 2003

(54) APPLIANCE COMMUNICATION AND CONTROL SYSTEM AND APPLIANCES FOR USE IN SAME

(75) Inventors: Vincent D. Abrams, Delray Beach, FL (US); Alexander Edwin Izzard, III, Delray Beach, FL (US); Glen Cunningham, Newburyport, MA (US); Kenneth R. Parker, Atlanta, GA (US); Timothy E. Woods, Novi, MI (US)

(73) Assignee: Sunbeam Products, Inc., Boca Raton, FL (US)

( * ) Notice: Subject to any disclaimer, the term of this patent is extended or adjusted under 35 U.S.C. 154(b) by 225 days.

(21) Appl. No.: 09/676,710

(22) Filed: Sep. 29, 2000

(51) Int. Cl.[7] .......... G05B 15/00

(52) U.S. Cl. .......... 700/83; 700/2; 700/9; 99/325; 7/110; 388/936; 340/310.01

(58) Field of Search .......... 7/110; 388/936; 700/2–4, 82–83, 9; 725/79; 340/310.01; 710/110; 709/208; 99/325

(56) References Cited

U.S. PATENT DOCUMENTS

| | | | | |
|---|---|---|---|---|
| 5,051,720 A | | 9/1991 | Kittirutsunetorn | 340/310.02 |
| 5,247,282 A | | 9/1993 | Marshall | 340/569 |
| 5,321,229 A | | 6/1994 | Holling et al. | 219/445.1 |
| 5,402,115 A | | 3/1995 | Tanaka | 340/3.1 |
| 5,491,463 A | | 2/1996 | Sargeant et al. | 340/310.01 |
| 5,565,855 A | | 10/1996 | Knibbe | 340/3.51 |
| 5,579,221 A | | 11/1996 | Mun | 700/83 |
| 5,623,256 A | | 4/1997 | Marcoux | 340/825.69 |
| 5,833,362 A | | 11/1998 | Shepard | 366/111 |
| 5,842,032 A | | 11/1998 | Bertsch | 340/310.08 |
| 5,894,479 A | | 4/1999 | Mohammed | 370/401 |
| 5,905,442 A | | 5/1999 | Mosebrook et al. | 340/3.7 |
| 6,007,236 A | | 12/1999 | Maguire | 366/141 |
| 6,175,860 B1 | | 1/2001 | Gaucher | 709/208 |
| 6,182,094 B1 | | 1/2001 | Humpleman et al. | 707/513 |
| 6,507,762 B1 | * | 1/2003 | Amro et al. | 700/83 |

* cited by examiner

*Primary Examiner*—John Follansbee
*Assistant Examiner*—Crystal J Barnes
(74) *Attorney, Agent, or Firm*—Lawrence J. Shurupoff

(57) ABSTRACT

A system of intelligent appliances coupled by common household power lines or wireless links. In particular, the system includes one of more of a kitchen console, a breadmaker, a slow cooker, and a rice cooker/steamer. One or more of the appliances serves as a system controller and may include a further communications interface for coupling to an external communications network, such as the telephone network. The system can thus be accessed and controlled remotely. The system can also communicate with and obtain information from remote sources such as Internet-based facilities.

19 Claims, 22 Drawing Sheets

APPLIANCE COMMUNICATION AND CONTROL SYSTEM AND APPLIANCES FOR USE IN SAME

CROSS-REFERENCE TO RELATED APPLICATION

The present application is related to and seeks priority for related information from U.S. patent application Ser. No. 09/482,789, entitled APPLIANCE COMMUNICATION AND CONTROL SYSTEM AND APPLIANCES FOR USE IN SAME, filed on Jan. 13, 2000, Attorney Docket No. SmrtHs-2-3106 (i.e., 055635-23106). The present application incorporates this related application by reference in its entirety.

FIELD OF THE INVENTION

The present invention relates to intelligent appliances and systems and methods whereby such appliances can interact with each other.

BACKGROUND INFORMATION

The use of power lines for the communication of data is well known. Power line communication (PLC) systems and methods have been used in a variety of applications, including the control of household appliances. One manufacturer, X10 Ltd. of Seattle, Washington provides a system comprising modules for controlling the application of power to appliances connected thereto in accordance with control signals generated by a controller and communicated over 110 VAC power lines. Like the modules, the controller plugs into the power lines. Each module includes a switch for selecting one of a plurality of identifiers by which the module is addressed by the controller, thereby allowing a plurality of appliances in a household to be controlled individually by one controller. The X10 system also includes a wireless controller that communicates via RF with a unit that is plugged into the power lines. The system can also communicate with devices such as battery-powered passive infrared motion detectors and other security-related devices via radio frequency (RF) links. The X10 system also includes a computer interface allowing a personal computer (PC) to control and program the system.

Systems such as the aforementioned suffer from several limitations and drawbacks. For example, the degree of control is limited to simply turning appliances on and off. There is no capability of communicating information between the controller and the appliances or among the appliances. Moreover, the aforementioned system does not provide a method of adding components and modifying the system that is user-friendly and flexible while providing a high degree of security.

SUMMARY OF THE INVENTION

The present invention provides a novel system whereby two or more appliances or devices can communicate and interact with each other over common power lines within a building. In an exemplary embodiment, the system comprises a controller device and a further device, such as a coffee maker appliance, that are each coupled to and powered from the wiring of a house. The controller and appliance communicate with each other over the household power lines using a bi-directional power line communications (PLC) protocol. The appliance can operate in a stand-alone mode or in accordance with messages received from the controller via the PLC interface. The appliance generates status messages that are received by the controller, thereby keeping the controller apprised of the state of the appliance.

In an exemplary embodiment, the controller is capable of communicating with external networks such as the Internet over a telephone connection or the like.

In a further exemplary embodiment, the present invention provides a system that allows wireless communication of data to and from appliances. As such, battery-powered devices or appliances that are not coupled to power lines can communicate and interoperate within a system of the present invention.

The present invention also provides intelligent appliances that are capable of communicating and interoperating in a system in accordance with the present invention.

Other features and advantages of the present invention will be apparent from the following description of the exemplary embodiments thereof, and from the claims.

DETAILED DESCRIPTION

Control and Communications System

Figure 1:
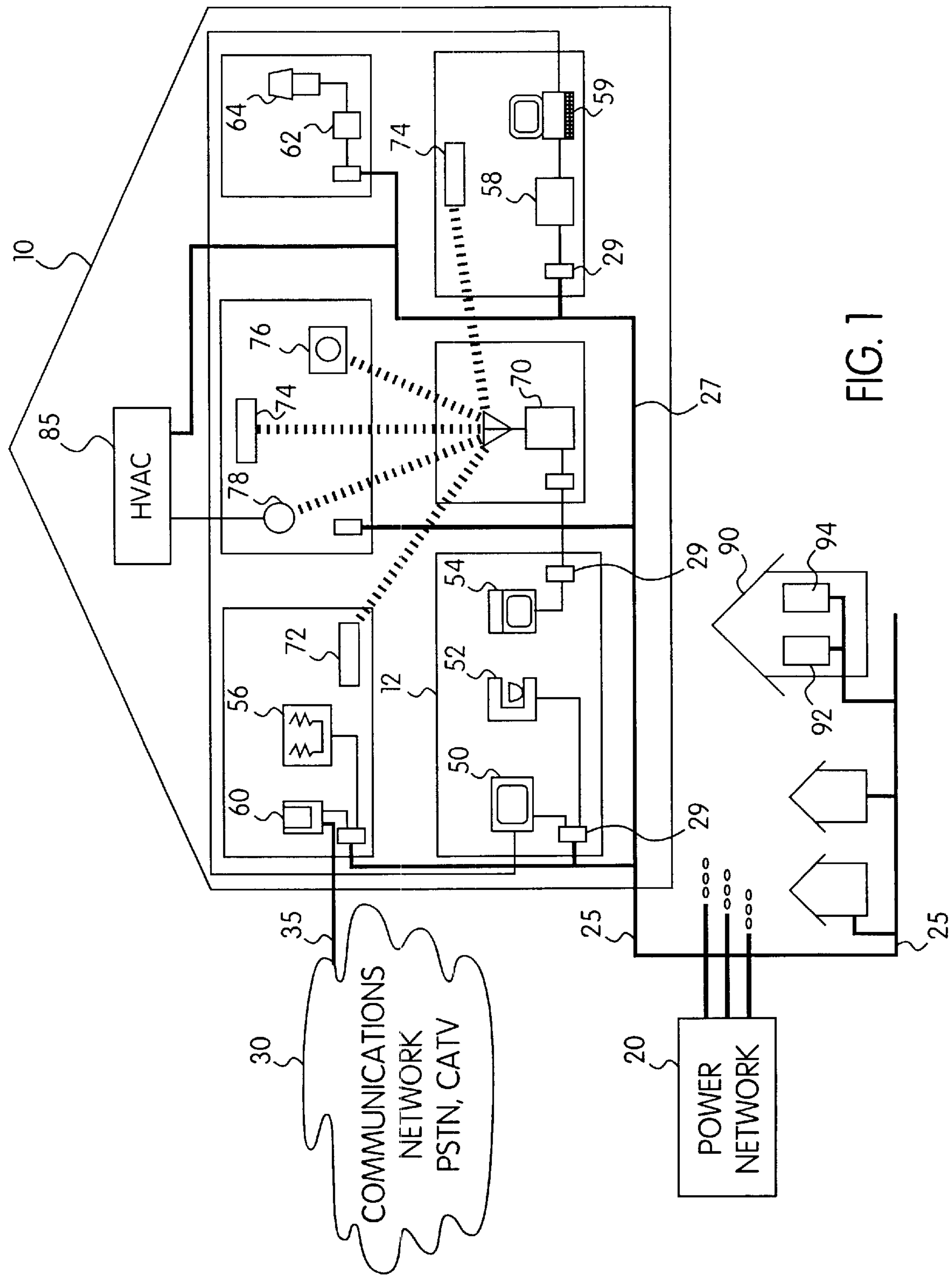
FIG. 1 shows a block diagram of an exemplary embodiment of a system in accordance with the present invention.

FIG. 1 is a block diagram of an exemplary embodiment of a system in accordance with the present invention. The system can be used in a variety of settings such as in a house 10, which typically has a plurality of rooms 12. The house 10 is typically coupled to a power network 20 and one or more communications networks 30, such as a PSTN or CATV network. Power, typically 50/60 Hz, 110/220 VAC, is provided to the house 10 in a known way over a power line 25 and distributed within the house over internal power lines 27 coupled to outlet boxes 29 arranged among the rooms 12 of the house. Communications, such as telephone or cable television signals are provided to the house 10 over one or more communication lines 35, in a known way.

The exemplary system of FIG. 1 comprises a plurality of devices or appliances (e.g., 50, 52, and 54) that can be coupled to the power lines 27 of the house 10 by being plugged into a power outlet 29. The exemplary system of FIG. 1 also includes devices or appliances (e.g., 72, 74, and 76) that are not plugged into any outlet. These will be described more fully below.

The various devices of the present invention that are coupled to the power lines 27 of the house are capable of receiving and/or sending data over the power lines 27 using a power line communications (PLC) protocol, described more fully below. (Devices that communicate via PLC will be referred to herein as PLC devices or appliances.) A system in accordance with the present invention includes at least two PLC devices, at least one of which acts as a controller. In the exemplary embodiment of FIG. 1, a kitchen console 50 and an enhanced function alarm clock 60 both act as controllers. The console 50 and the alarm clock 60 can be used to control the operation of and to receive and display information from other devices or appliances in the system. The controllers 50 and 60 may also be coupled to an external communications network (e.g., the internet, world wide web) via telephone, DSL or cable TV lines 35 or the like, or via a wireless link such as cellular telephone, satellite or the like. Such external access provides the system of the present invention with a wide array of enhanced capabilities, described more fully below.

Other PLC devices in the exemplary system of FIG. 1 include a stand mixer 52, a coffee maker 54 and an electric blanket 56. A conventional PLC device 62, such as the AM465 Lamp Module or AM466 Appliance Module available from X10 Corp., can also be included in an exemplary system of the present invention, for controlling the application of power to a lamp 64 or an appliance. The system of the present invention is preferably backward compatible with such conventional PLC devices (e.g., the PLC interface circuitry of the various devices of the present invention is preferably compatible with the X10 protocol as well as the more advanced EIA-600 protocol described more fully below.) The PLC devices 52, 54 and 56 receive commands and/or data from the controllers 50 and 60 and transmit status information to the controllers 50 and 60. The functions of the various PLC devices and the messaging used in the system of the present invention will be described more fully below.

The exemplary system of FIG. 1 may also include a heating, ventilation and air conditioning (HVAC) system 85 which includes a PLC interface and is thus capable of sending and receiving commands and data over the power lines 27. The HVAC system 85 may be coupled to a thermostat 78 which includes a PLC interface or a wireless interface, described below, for communicating within a system of the present invention.

The exemplary system of FIG. 1 comprises a further device 70 which includes two interfaces: a PLC interface for communicating with other PLC devices over the power lines 27, and a wireless interface for communicating with one or more devices that are not powered via the power lines 27 and thus lack PLC interfaces. (The latter devices will be referred to as wireless devices.) The device 70 acts a bridge between the PLC devices and the wireless devices, thereby allowing them to communicate with each other. (The device 70 will therefore be referred to as a PLC/wireless bridge.)

The exemplary system of FIG. 1 includes several wireless devices: a foot scale 72, smoke detectors 74, and a blood pressure monitor 76. The wireless devices 72, 74, and 76 communicate with the bridge device 70 over a wireless link. In a preferred embodiment, such a link uses radio frequency (RF) signals, although other wireless technologies such as infrared (IR) may also be used. RF is preferred since it does not require an unobstructed line-of-sight path between the transmitting and receiving devices thereby affording greater freedom in the placement of devices.

The exemplary system of FIG. 1 also includes an interface device 58 for interfacing devices such as personal computers (PC) to the system of the present invention. The interface device 58 comprises a PLC interface and a further interface, such as an RS-232 serial interface, for coupling to a conventional PC 59. Thus coupled to the system, the PC 59 can act as a system controller. Like the console 50 and the alarm clock 60, the PC 59 may also be linked to an external communications network over telephone lines, cable, or the like.

Figure 2:
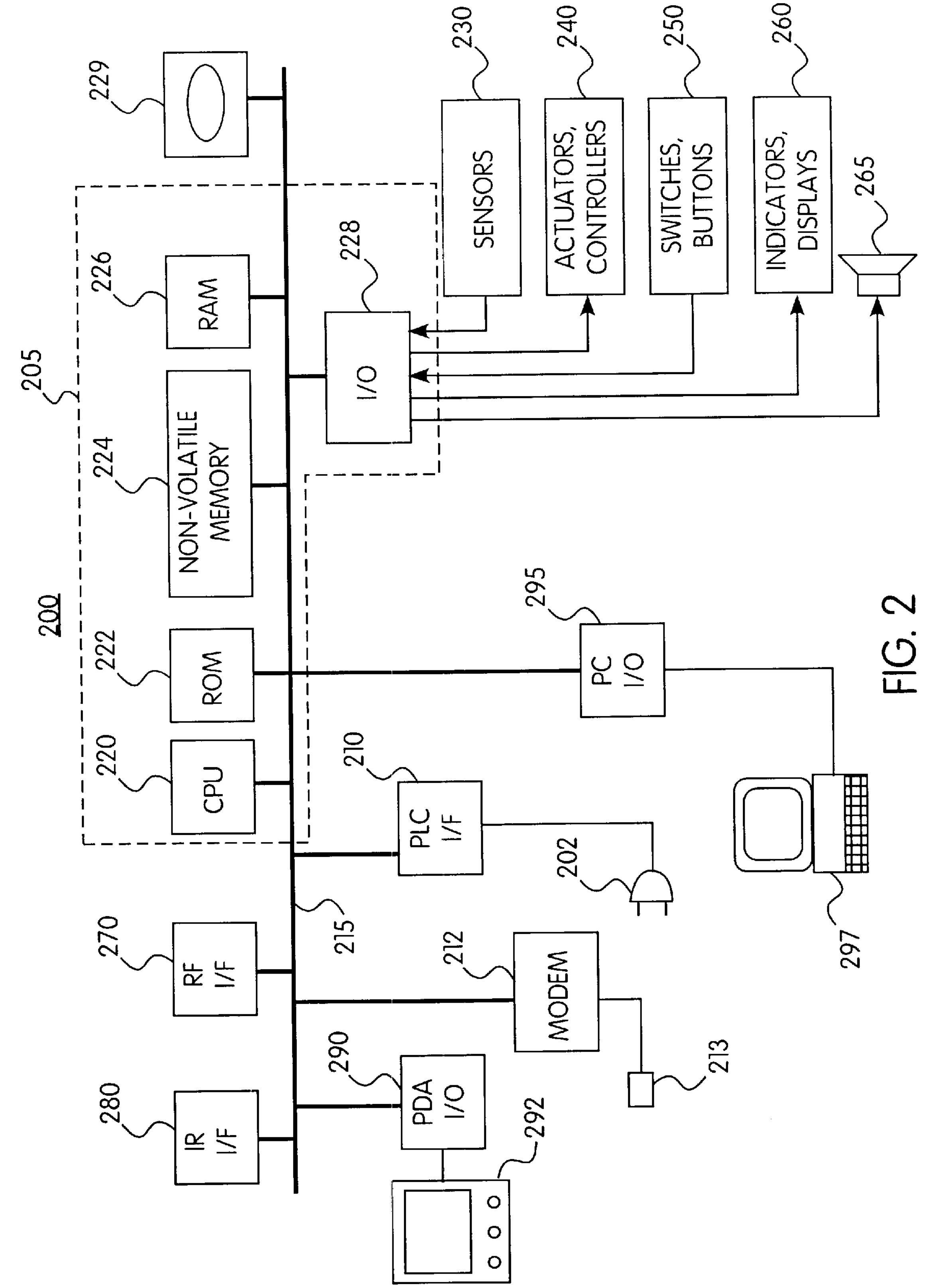
FIG. 2 shows a block diagram of an exemplary generic appliance in accordance with the present invention.

FIG. 2 is a block diagram of an exemplary embodiment of a device 200 in accordance with the present invention for use in a system of the present invention. The exemplary device of FIG. 2 represents a generic device or appliance typically having a superset of the functionality that may be found in any one device. Generally, each of the aforementioned devices or appliances can be implemented with a subset of the functional blocks shown in FIG. 2.

As shown in FIG. 2, each device 200 includes a central processing unit (CPU) 220; a read-only memory (ROM) 222; non-volatile memory 224, such as electrically-erasable programmable ROM (E2PROM) or flash memory; random access memory (RAM) 226; and some form of input/output (I/O) controller 228 coupled to one or more of a set of sensors 230, actuators 240, switches 250, indicators 260 and sound generating devices 265. The capacities and capabilities of the various components and the mix and function of the sensors, actuators, switches and indicators will depend on the device represented by the block diagram of FIG. 2. For example, an exemplary embodiment of the mixer appliance 52 includes several buttons, a multi-segment LCD display, a dial, whose position is detected by a rotary encoder, a current sensor (for sensing the torque applied by the mixing motor), a variable speed motor controller, and a plurality of load cells for measuring weight.

The CPU 220, ROM 222, E2PROM 224, RAM 226 and I/O block 228 can be implemented as a combination of one or more discrete components or with a single-chip microcontroller 205 such as those of the Z8 series manufactured by Zilog Corporation. Some devices, such as the console 50, described more fully below, may include mass storage 229 with fixed and/or removable storage media (e.g., hard drive, CDROM, floppy disk, DVD, etc.) or the like. The blocks 220–229 are coupled to and intercommunicate over a bi-directional bus 215 in a known way.

Devices of the present invention that are powered from household power (e.g., 110 VAC) or are otherwise coupled to the power lines 27 (i.e., the aforementioned PLC devices) comprise PLC interface circuitry 210. The PLC interface 210 couples to the power lines 27 via a conventional power connector 202. The interface 210 is coupled to the bus 215 and communicates with the other blocks in the device 200 that are coupled to the bus. The PLC interface circuitry 210 can be implemented using an SSC P300 integrated circuit (IC), available from Intellon Corporation of Ocala, Fla. Other implementations for the PLC interface are possible, although it is preferable that the PLC interface comply with an industry standard such as the EIA-600 standard (or "CE Bus" standard). The EIA-600 standard PLC interface provides 9.6–19.2 Kbaud, bi-directional communication over standard household power wiring. In an exemplary system of the present invention, the data rate is 9.6 Kbaud, although rates as low as 1.2 Kbaud may be used. The EIA-600 standard also provides higher level messaging functions using a Common Application Language (CAL).

The aforementioned wireless devices 70–78 comprise an RF interface 270 and/or an IR interface 280, depending on the wireless technology employed. The RF interface 270 may be bi-directional or, in order to limit power consumption, unidirectional (i.e., transmit-only), and can be implemented in a known way. In the case of a unidirectional RF interface 270, it may be desirable to also include an IR interface 280 that is at least capable of receiving. As described more fully below, the wireless devices 70–78 can use such an interface to receive programming information upon initial set-up. Moreover, an IR interface 280 can be included in any device (PLC or wireless) to allow the device to communicate with other devices such as Personal Digital Assistants (PDAs) 292 or telephones having IR interfaces. It may also be desirable to provide some devices with a docking interface 290 for devices such as PDAs 292. For example, with a PDA port 290 (or IR interface 280) the mixer 52 can be controlled directly from a PDA 292 either in a manual mode (e.g, with the PDA 292 acting as the mixer's control panel) or in an automatic mode (e.g, with the mixer executing a recipe downloaded from the PDA 292). This capability would allow an appliance of otherwise conventional functionality to greatly expand its capabilities. A device with a PDA 292 coupled thereto (either directly or by a wireless link) may also act as a system controller.

Additionally, wireless devices may include rechargeable batteries and a recharger outlet in which a recharger cord removably fits. The recharger cord is attached to a recharger that has a power cord that plugs into a power outlet of the house. The recharger may serve the dual purpose of re-energizing the batteries as well as providing a PLC interface to a controller such as console 50. Once the recharger cord is plugged into the recharger outlet and the power cord is plugged into a power outlet, the wireless device may exchange programming and installation data with the controller. Use of a wired connection to the controller provides greater bandwidth with which the wireless device may communicate with the controller, facilitating the faster exchange of larger volumes of information and data than likely would be exchanged using the wireless connection.

Devices such as the kitchen console 50 and alarm clock 60 that are capable of external data communication include a modem 212, or the like, for communicating over the medium of choice (e.g., telephone, cable, wireless).

While each of the appliances of the present invention, such as the mixer 52, coffee maker 54, electric blanket 56, alarm clock 60, scale 72, smoke detector 74 and blood pressure monitor 76, are capable of operating individually in a stand-alone mode, adding an additional device of the present invention, such as a console 50, to the same household creates a control and communications system which provides substantially enhanced functionality and capabilities. A user may thus, for example, first purchase a coffee maker 54 and then add a console 50 or alarm clock 60. When a controller 50, 59, 60 and another PLC device are plugged into the power lines 27 of a household 10, an appliance communication and control system is thus formed, in accordance with the present invention. When a PLC/wireless bridge 70 is added, a mix of wireless components 72, 74, 76 can also be included in the system.

An exemplary procedure for setting up a system and adding devices to a system in accordance with the present invention will now be described with reference to FIG. 3.

When a controller, such as the console 50 or the alarm clock 60, is plugged into the power lines 27 of a house 10, it will first perform a search (step 302) for other controllers 50, 59, 60, that may be plugged into the power lines of the house. If the controller 50, 59, 60 determines (step 303) that there are no other controllers plugged into the power lines 27 of the house 10, it will select a house code (step 304) for the house 10 and proceed to search for other PLC devices (step 306) that may already be in the house (operating as stand-alone appliances) but that have not yet been enabled or programmed for communication over the system of the present invention. PLC devices in accordance with an embodiment of the present invention that are powered and operating will periodically emit identifying information (e.g., model number and serial number). The controller 50, 59, 60 will monitor the PLC interface for such identifying information (step 306). If the controller 50, 59, 60 detects valid identifying information that it has not detected before (step 307), thereby indicating the detection of a new device, it will provide the new device with the house code (step 308). The new device will store the house code in its non-volatile memory and preferably acknowledge this event with an appropriate message to the controller 50, 59, 60 (step 310). Within the acknowledgement or a subsequent message, the new device may also provide the controller 50, 59, 60 with any relevant additional data for the device (e.g., software version, register contents, configuration information, etc.) The controller 50, 59, 60 will then enter the device information (e.g., serial number, model number, software version, etc.) into a database in its non-volatile memory. Some device information need not be stored at the controller, however, since it can be queried at any time the device is coupled to the system. For example, it may not be cost or space efficient or useful to store the software versions and manufacturing lot numbers of the appliances in each controller, but the information will still be available at the appliance and can be retrieved as needed.

Once a device has been programmed with a house code, it will respond only to messages that reference that house code. Moreover, messages originating from the device will reference the house code stored in the device. Any further messages communicated between the controller 50, 59, 60 and the device must include the correct house code or else the recipient ignores them.

By storing the house code in non-volatile memory, an appliance may be removed and reconnected to a system of the present invention and it will retain its associated house code. For example, a stand mixer 52 is often kept under the counter and plugged in only when needed. It will keep its house code so that it does not need to be reinstalled in the home system every time it is plugged in. If the house code stored in an appliance is to be changed, the user, in an exemplary embodiment, must initiate a reset sequence to clear out the old house code, such as by pressing and holding a certain button or buttons while the device is powered. This would restore the appliance to its default state (i.e., as from the factory), ready to be reinstalled in the same or a different home with a different house code.

Because multiple homes may be coupled to the same power distribution trunks 25, as shown in FIG. 1, it is possible for PLC signals from one house 10 to propagate to another house 90 coupled to the same power distribution trunks 25. By thus assigning a house code to the devices within each house, in accordance with the present invention, a device within a house will communicate only with a controller within the same house and not with controllers located in other houses coupled to the same power distribution trunks 25. This arrangement prevents a controller 92 or a PLC appliance 94 located in a house 90 from communicating with the controllers or appliances of the house 10, and vice versa.

If a newly added controller 50, 59, 60, detects that there is another controller already in the system (step 303), the newly added controller obtains the house code from the established controller, stores the house code in its non-volatile memory and uses the house code in its communications, as in the case of any newly added PLC device (step 305).

In an exemplary embodiment of a method for adding an appliance or a controller to a system of the present invention, an already installed controller is placed in a search mode that looks for new appliances and controllers in the home. This special mode times out after a predetermined period of time (e.g., 5 minutes) within which the user would have to plug in or activate the new appliance or controller. The likelihood of a neighboring system having one of its controllers in that mode at the same time is extremely low, in which case the neighboring controllers would not detect any one else's appliances as they are installed. In the unlikely case that two buildings having sufficient electrical connection to detect each others signals and each had a controller in the same search mode at the same time, then the controllers would both show any appliance newly installed in either system during the time period of the search mode. In this embodiment, the user is required to confirm the addition of each new appliance by pressing a button or taking a similar action at the controller. If a user nonetheless accidentally programs an appliance in a neighbor's house to be part of his system, then the user could have control of that appliance until the real owner corrected the problem. Presumably the real owner would immediately be aware of the mistake, since his controller would not be able to find the new appliance (since it attached and configured to the neighbor's house code). He would then be directed (e.g., by the instruction manual or on-line instructions provided by the controller) to initiate a house code reset in the appliance and to try again. This would clear the neighbor's house code from his appliance and allow him to correctly configure it for his home.

The communication and house code setup described above would apply equally to the addition of new controllers into a home. In addition to the original controller telling the new controller what the house code should be, it could also transfer controller-specific information such as information about user-selected identifiers for each of the appliances in a home. For example, an internal table could relate the serial number of each smoke alarm to a room (basement, garage, hallway, etc.) Also, multiple appliances of the same type may be described by use or owner, such as with "his" and "hers" coffee makers that might be loaded with different types of coffee.

Figure 3:
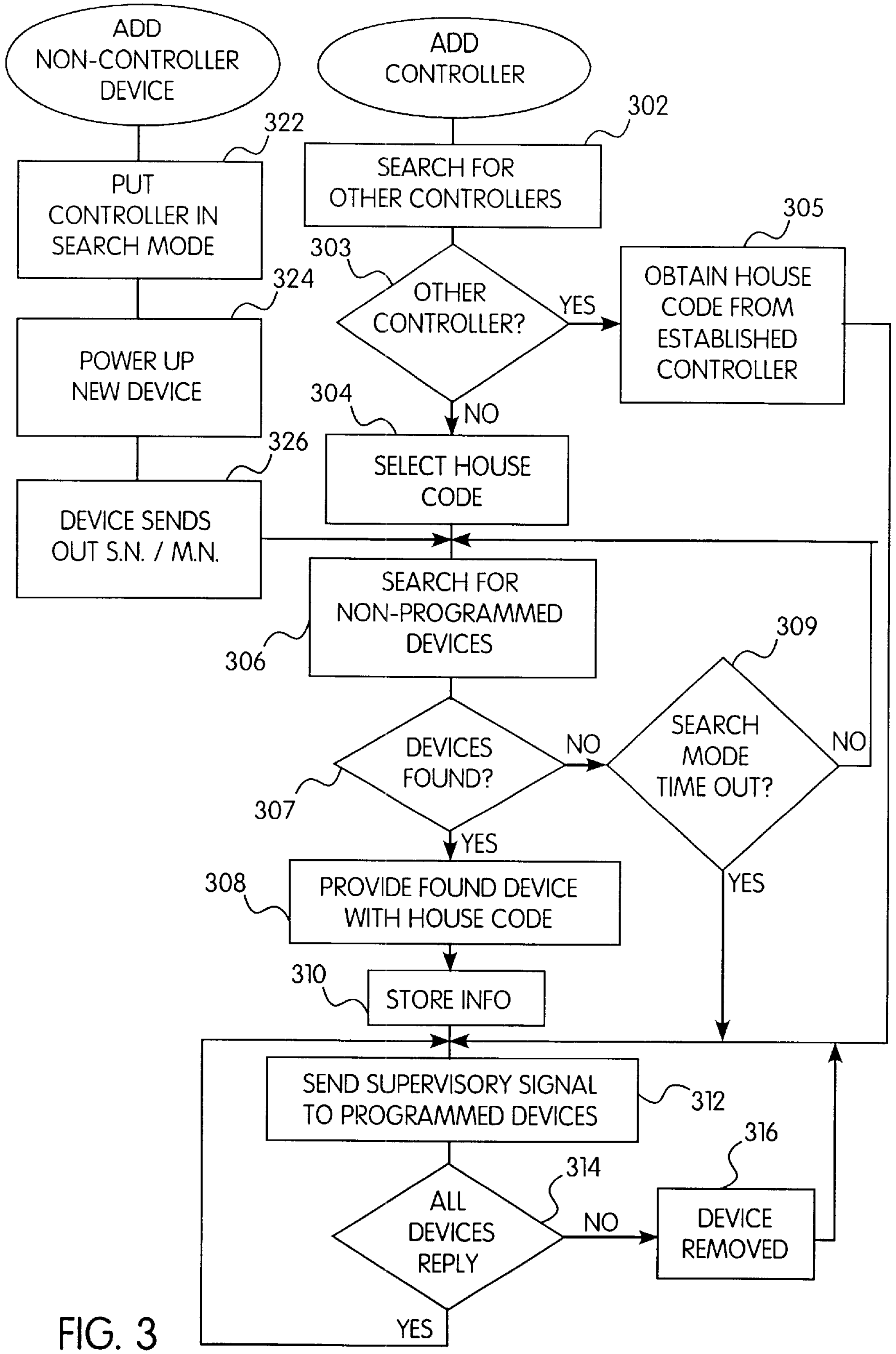
FIG. 3 shows a flow chart of an exemplary procedure for configuring a system in accordance with the present invention.

FIG. 3 illustrates an exemplary procedure for adding a new appliance to an already operational system of the present invention. To initiate the addition of a new appliance, the user preferably puts the controller 50, 59, 60 into a search mode (steps 322). The user then powers the new device (step 324) which then begins to transmit its identifying information (e.g. model number and serial number)(step 326). The controller 50, 59, 60 monitors the PLC interface (step 306) and proceeds as described above if a new device is detected. The controller 50, 59, 60 will stay in the search mode for a predetermined period of time (e.g., 1 min) and then return to normal operation (step 309).

In an alternative embodiment, a newly added device can initiate this procedure without requiring the user to place the controller 50, 59, 60 in a search mode. This may create the problem however, of causing a controller in a neighboring building to inadvertently add the new device to the neighbor's system. In this case, before the controller provides the new device with the house code, the user can be asked to confirm this operation by manually entering the device's serial number into the controller. The controller then checks the user-entered serial number against the serial number received from the new device and if there is a match, will proceed to add the new device to its database and to provide the new device with the house code.

In an exemplary embodiment, the initial programming of wireless devices such as the scale 72, smoke detector 74 and BP monitor 76 is handled primarily by the PLC/wireless bridge device 70. In this embodiment, the bridge device 70 programs the newly added wireless device with the house code and wireless communications channel information via an IR interface, as described more fully below. The newly added wireless device confirms its initialization by transmitting its identifying information (e., serial and model numbers) along with the house code to the bridge device 70. The bridge device 70, in turn, via the PLC interface, informs the system controller of the new wireless device and provides to the system controller the identifying information for the newly added wireless device. The controller then adds the new wireless device to its database.

During normal operation, the controller 50, 59, 60 will periodically broadcast (e.g., hourly, daily) a supervisory message to all of the devices on the system (step 312). In addition to the house code and other system-specific information, the supervisory message preferably includes the current time and date. A properly operating device will reply to the supervisory message. Devices that include a clock function can use the time and date broadcast in the supervisory message to synchronize their clocks. If the controller 50, 59, 60 determines (step 314) that one or more devices listed in its database as active did not reply to the supervisory message, the controller will assume that the non-responding devices were removed from the system and thus remove those devices from its database (step 316). Preferably, the controller 50, 59, 60 maintains a log of devices that are removed from the system including the time and date of removal. When a safety device such as a smoke detector 74 or the like is removed, the controller preferably generates an alert to inform the user.

The action the controller takes when a previously logged appliance is absent from the system preferably depends on the appliance. A safety or security related device such as a smoke alarm or motion sensor may warrant the controller setting off an alarm or other more urgent notification. An appliance that is expected to be removed and reconnected regularly, such as the stand mixer, may simply be displayed on the controller with its current connection status only when the user causes the controller to enter a status display mode. In an exemplary embodiment, the controller will rely on the user to tell it to remove a non-connected device from its internal databases, in most cases. For example, if a smoke detector has failed and must be discarded, the controller will detect the smoke detector's absence and can provide an indication to the user. The user may then be required to confirm that the device should be permanently removed from the system. This can be either by a user-initiated command, or by a user response to a controller's query, e.g. a display of the question "HALLWAY smoke alarm not detected. Remove from system permanently?".

A further procedure may be used to add conventional devices, such as X-10 devices, to a system of the present invention. With such devices, a house and a device code are manually selected at each device. Being listen-only, such devices do not broadcast their code settings. When adding such a device to a system of the present invention, the user manually enters the house and device codes selected on the device into the system controller. The system controller then uses those codes when communicating with that device (e.g., using the X-10 protocol).

Intelligent Appliances and Devices

Each of the devices and appliances mentioned above will now be described in greater detail with reference to FIGS. 4 through 17.

PLC Appliances and Devices

Kitchen Console

Figure 4:
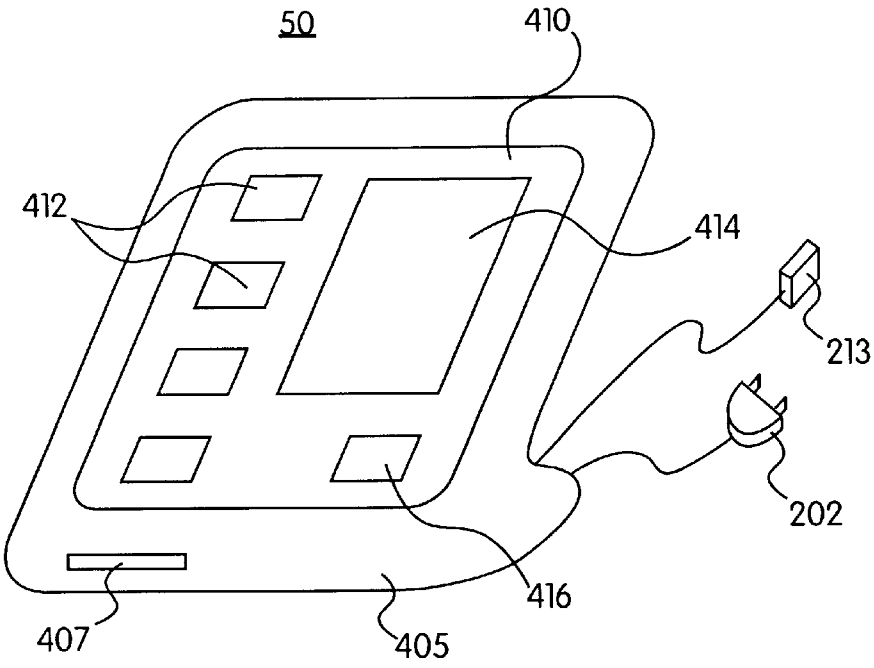
FIG. 4 shows an exemplary embodiment of a console device in accordance with the present invention.

FIG. 4 shows an exemplary embodiment of a console 50, in accordance with the present invention. The console 50 comprises a housing 405, which houses the circuitry of the console including a touchscreen display 410. The touchscreen display 410 can be implemented using conventional components, such as a 12" diagonal, 800×600 resolution, back-lit, color, liquid crystal display (LCD) with a touch-sensitive array overlaid thereon. In an alternative embodiment, the console 50 may be provided with a keyboard and/or a pointing device such as a mouse or track ball (not shown) in addition to or as alternatives to the touchscreen. Since the console 50 will likely be used in a kitchen, it is preferable that the console be easy to clean and be resistant to the often harsh conditions prevalent in a kitchen setting.

The exemplary console 50 is provided with a power cord and connector 202 and a telephone cord and connector 213. The housing may include an opening 407 for inserting removable storage media 229, such as a CDROM, DVD, floppy disk, or smart card into the console.

The touchscreen display 410 may display a multitude of images and combinations thereof such as one or more softkeys 412, static or moving images 414 or other display elements 416 such as advertising, promotional offers, or blocks of information such as weather, news headlines, stock tickers, or the like. Depending on the nature of the display element, pressing the touchscreen at the display element can provide additional information or initiate further actions. For example, a display element 416 may display an offer of a discount coupon. By pressing on the display element, the discount coupon can be added to an electronic shopping list maintained by the console 50.

It should be noted that a similar user interface could be provided with a PC 59 coupled to the system of the present invention. In that case, a mouse and keyboard would most likely be used in place of the touch-sensitive screen.

Figure 5A:
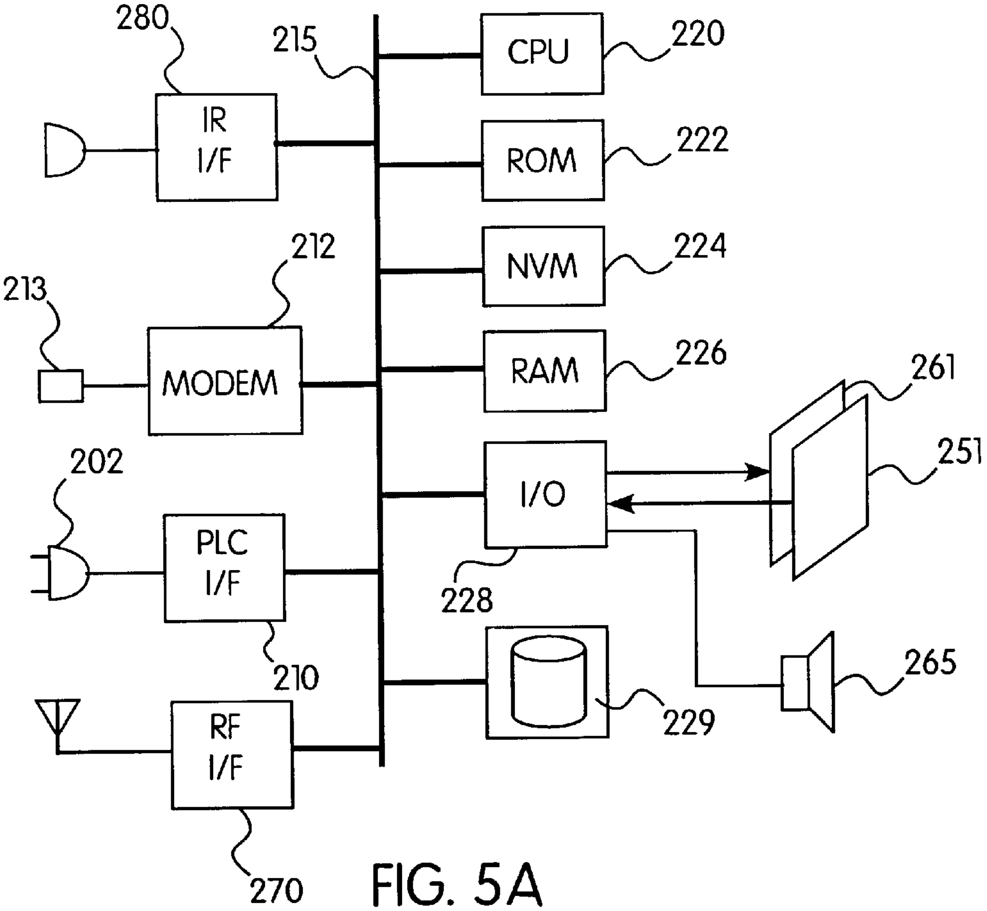
FIGS. 5A and 5B show block diagrams of exemplary embodiments of a console device in accordance with the present invention.

FIG. 5A shows a block diagram of the major functional elements of the circuitry of the console 50. In an exemplary embodiment, the CPU is a Pentium class processor, from Intel Corporation, 64 MB of RAM 226 and 1 KB of NVM are included. Mass storage 229 comprises a 6 GB hard drive and a CD-ROM drive. The I/O block 228 comprises a video control circuit, for driving the LCD 261, a touchscreen scanning circuit for detecting presses of the touchscreen array 251 and a sound control circuit for driving a sound generating device 265, such as a loudspeaker, piezoelectric element or the like. The sound generating device 265 is used to produce various sounds such as alarms, prompts, key clicks, etc. or to reproduce voice or music. Each of the aforementioned blocks can be implemented using known devices.

The console 50 includes a PLC interface 210 and may also include an RF interface 270 and/or an IR interface 280.

A modem 212 is included to allow the console to communicate over conventional telephone lines. In an alternate embodiment, the modem itself may be a PLC device, accessible to other PLC devices, such as the console 50, via the PLC interface. The kitchen console 50 may also include a telephone and/or speakerphone (not shown) for voice communications over the telephone lines.

As discussed, the console 50 serves as a controller in an appliance communication and control system of the present invention. In addition to providing a user interface, the console 50 also provides a communications interface to external networks, such as the Internet, via its telephone connection. In a typical application, the console 50 can be used, for example, to browse the Internet for recipes. The recipes can be displayed on the touchscreen 410 with each recipe step having an associated softkey 412 that the user can press to request additional information (e.g., ingredient substitutions) or to indicate that the associated step has been completed. The console 50 can also provide the recipes to other devices in the system, such as the mixer 52. As explained more fully below, the mixer 52 can display the recipe steps and execute mixing functions in accordance with the recipe steps.

As a system controller, the console 50 maintains identifying and status information for each of the devices coupled to the system. The console 50 can thus be used to display status information for the various devices in the system. For example, if the coffee maker 54 has completed a brew cycle, it can send a message to the console 50 informing it of this event. The console 50 can then display a graphic indicating that the coffee maker 54 is ready to serve coffee.

In addition to device status and identifying information, the controller can also maintain a log of any error messages or alarms generated by the controller or a device.

Moreover, the various devices and/or the controller can maintain usage information, e.g., button presses, operational cycles, etc. For example, the coffee maker 54 can keep track of the number of presses of each button on its control panel, the start and end times of each brew cycle, etc. This information can be maintained locally at the appliance and uploaded to the controller periodically or upon demand.

Additionally, the controller (e.g. console 50) can supply the system information remotely. This ability is helpful, for example, when obtaining customer support for an installed system. By uploading the system information to the customer support system, a customer representative can be provided with the system information conveniently and accurately during a customer service call. Furthermore, the customer support system may also be able to run diagnostic tests remotely on a customer's system and to download the latest software for each appliance. The appliance usage information is also valuable in determining how the appliances are being used, thereby giving insights as to how they can be improved or modified.

The console 50 by virtue of its external connectivity provides a point through which the system of the present invention can be monitored and controlled remotely. For example, by accessing the console 50 over the internet or by telephone, a user can obtain the status of the various devices and appliances within the system. By the same connection, the user can also control the various devices and appliances. For example, a user can dial the console 50 and reset the brewing start time of the coffee maker 54 or activate a preheat feature of the heating blanket 56. The user can also query the system to determine whether any appliance or device has been activated or used during a specified period.

Remote access to the system of the present invention via a system controller, such as the console 50, is preferably secured such as by requiring the user to enter a password. Local access and activation of the system can also be controlled by password. For example, an authorized user can lock or disable selected appliances of the system so as to disable their operation for a pre-selected period of time or until the correct password is provided to the system. Such a locking function can be performed remotely, at the system controller or at each appliance. The user can also assign one or more temporary access passwords that allow temporary access to or activation of all or some of the system appliances. Such a feature is useful, for example, where the user would allow cleaning personnel to use the coffee maker 54 between the expected working hours but would not allow the cleaning personnel to use the mixer or the kitchen console 50. The user can also access the system to determine if and when the temporary access password has been entered.

The system of the present invention, via the console 50, or other such system controller, can interact with networks such as the Internet in context-specific and targeted modes that are heretofore unprecedented. Via the console 50, the system of the present invention can browse the Internet and access information therefrom as a function of the operational state of the system and/or of information gathered by the system. For example, when a user is accessing a recipe on a recipe website, the user can add all or some of the listed ingredients to a shopping list by pressing the touchscreen next to or on the respective ingredients. Selected ingredients may also have manufacturers' discount coupons attached thereto. Once completed, the user can electronically send the shopping list, with coupons, to an online grocer for processing, payment and delivery. The list can also be printed at a printer coupled to the system (e.g., via the PC 59) or uploaded to a PDA via the IR interface 280 or other serial data interface of the console 50. Once in the PDA, the list can then be downloaded to a receiving system at a grocery store for processing.

Figure 5B:
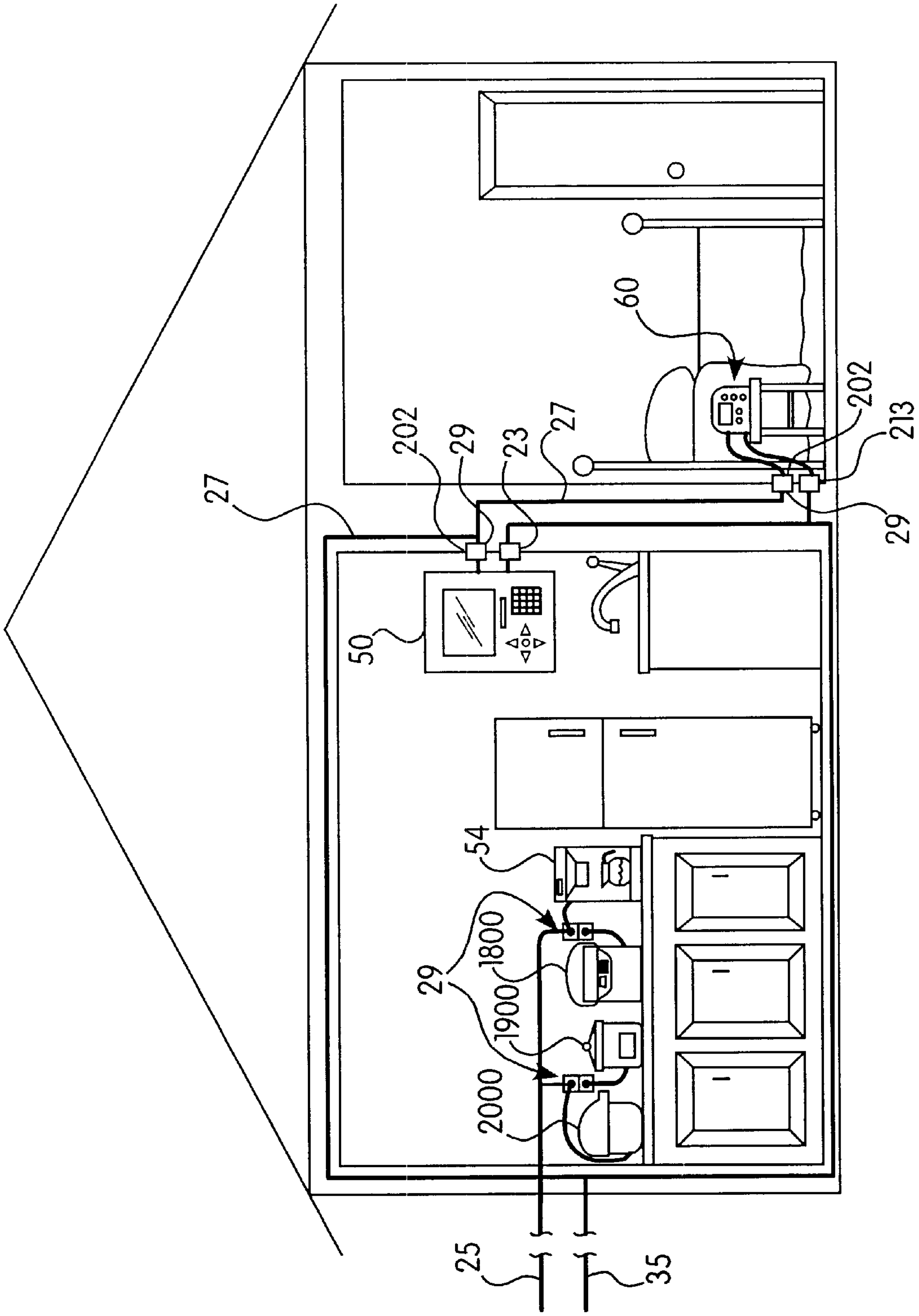

The controller may also assist in preparing an entire meal. In addition to suggesting and retrieving recipes, acquiring coupons for the ingredients, and purchasing or scheduling the purchase of ingredients, a controller such as the kitchen console 50 may coordinate the preparation of the ingredients and their cooking using intelligent appliances connected to the system. FIG. 5B shows an exemplary embodiment of the present invention for the preparation of a meal. For example, a suggested meal may include bread, stewed vegetables and meat, and brown rice.

In an exemplary embodiment, the kitchen console 50 first would instruct the user as to the preparation of the ingredients for each item. After detecting a breadmaker 1800, a slow cooker 1900, and a rice cooker 2000 (described below), the kitchen console 50 would program the appliances according to the recipes. Based on the estimated desired time of the meal, the console 50 would activate the appliances individually so that all of the items would be finished cooking at the same time. Furthermore, the user may reprogram the console 50, either directly or remotely, to change the estimated time of the meal, in the event that the user's schedule changed. However, only the console 50 can control the appliances in preparation of the meal. The controller therefore would adjust the cooking times, cooking temperatures, or both, of the appliances to have a hot, fresh meal ready at the revised mealtime. The programmed completion time can be changed remotely by all remote means that interact with the console 50.

The kitchen console 50 also may adjust automatically the estimated desired meal time based on information received from, for example, an alarm clock. If the meal in question is breakfast and the meal consists of muffins, coffee, and hot cereal, then the console may have programmed the breadmaker, coffee maker, and slow cooker to have the food ready shortly after the user awakes based on the alarm time of the alarm clock. However, if, for instance, the user presses the snooze button, delaying the estimated waking time by 10 minutes, the alarm clock may alert the console 50 to the fact, which may in turn delay the cooking times appropriately. In the absence of a console 50, the alarm clock, acting as the controller, may adjust directly and automatically the appliance programming.

The system of the present invention can also provide a valuable targeted marketing function. In addition to the aforementioned coupon scenario, the system controller, such as the console 50, can receive and display advertising and promotional information which can be tailored to a specific task being carried out by a user with the system of the present invention. For example, when the user is programming the coffee maker 54, the console 50 can download or display a previously downloaded advertisement (preferably downloaded during low network usage hours) for a particular brand of coffee, which may also include an electronic coupon. If the user wishes to purchase the item, he can add it to a shopping list, as described above. In another exemplary scenario, if weight measurements uploaded from the scale 72 to the console 50 suggest a significant weight increase, the console can download suggestions for dietetic food or an advertisement for a health spa. Preferably, the user can control the provision of such information and advertising.

The console 50 can also provide a variety of additional functions. For example, the console can serve as a home organizer or household information center, storing and displaying messages, reminders, telephone numbers and addresses. The console 50 can also be programmed to search for and download news and information such as sports and weather reports with pre-programmed "hot keys" for selected websites. Periodically updated information such as news can preferably be downloaded during low traffic hours and presenting later on request. The console 50 may also provide personalized "homepages" for each of multiple users for storing and providing restricted access to personal information such as memos and weight and blood pressure information obtained from the scale 72 and BP monitor 76.

Alarm Clock

Figure 6:
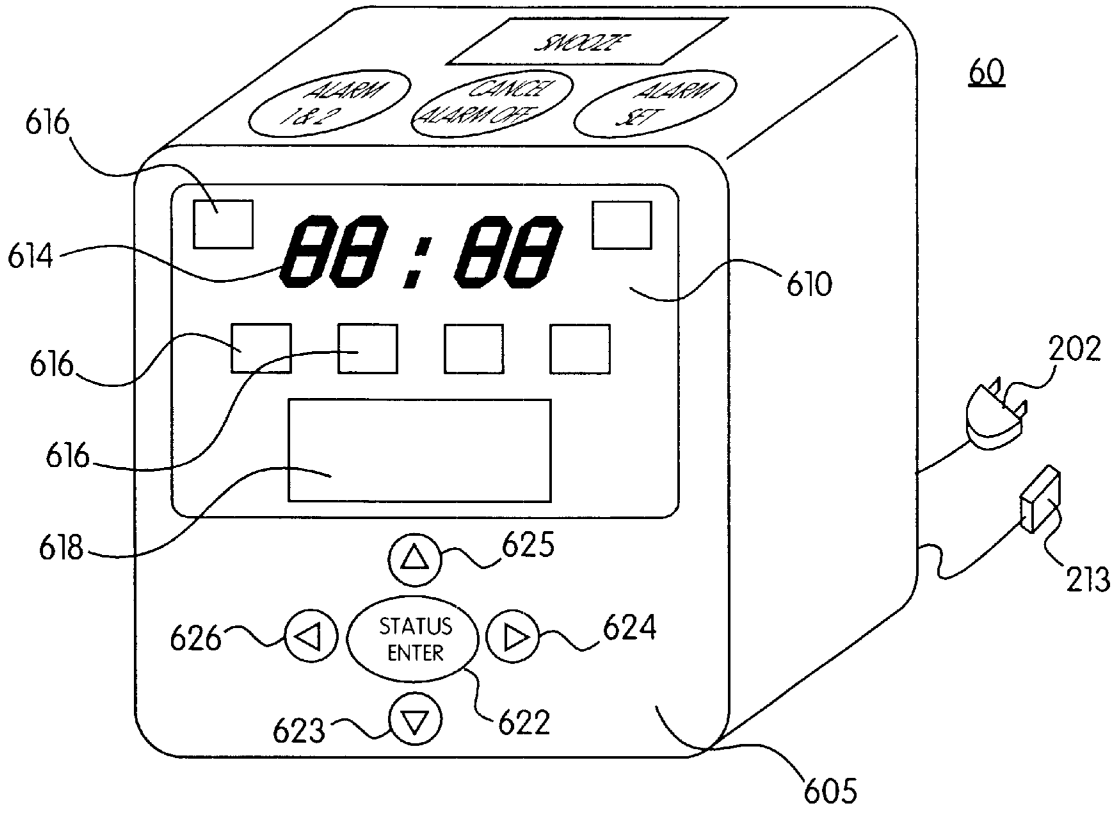
FIG. 6 shows an exemplary embodiment of an alarm clock device in accordance with the present invention.

FIG. 6 shows an exemplary embodiment of an alarm clock 60, in accordance with the present invention. As mentioned, the alarm clock 60, like the console 50, can act as a system controller. A system in accordance with the present invention may have multiple controllers, although the various controllers may have different capabilities and features. Whereas the console 50 will typically be located in a kitchen, the alarm clock 60 will typically be located in a bedroom.

As shown in FIG. 6, the clock 60 comprises a housing 605, which houses the circuitry of the clock, a display 610 and buttons 607 and 622–626. The exemplary alarm clock 60 is provided with a power cord and connector 202 and a telephone cord and connector 213. The housing 605 may comprise an opening (not shown) for a sound-generating device such as a speaker.

The display 610 may comprise a time display field 614, with a set of seven-segment digit elements, a plurality of fixed graphics 616 which can be selectively enabled and a bit-mapped display field 618. A wide variety of display layouts and elements are possible. For example, in an alternate embodiment, the seven-segment digit elements can be replaced with a graphic representation of an analog-type clock face. The display 610 can be implemented in a known way using LCD technology and is preferably backlit.

The buttons 622–626 are used to move a cursor and/or navigate through graphics, menus, etc. displayed on the display 610. The buttons 607 are used for conventional alarm clock functions such as snooze, alarm set, etc.

Figure 7:
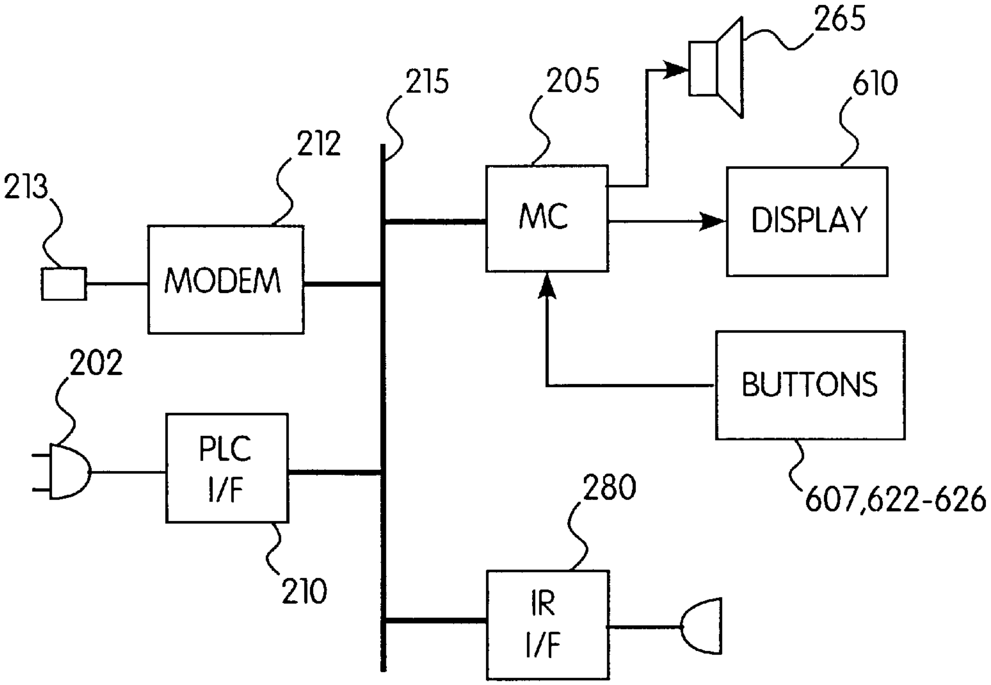
FIG. 7 shows a block diagram of an exemplary embodiment of an alarm clock device in accordance with the present invention.

FIG. 7 shows a block diagram of the major functional elements of the clock 60. A modem 212, or the like, is included to allow the clock to communicate over telephone lines. A PLC interface 210 allows the clock to communicate with other PLC devices over power lines. The microcontroller 205 controls the display 610 and receives inputs from the buttons 607 and 622–626. The alarm clock 60 may also include an IR interface 280 for communicating with wireless devices. A sound generating device 265, such as a loudspeaker, piezoelectric element or the like, is controlled by the microcontroller 205 to produce various sounds such as alarms, prompts, key clicks, etc. The alarm clock 60 may also include a radio circuit (not shown) so as to act as an alarm clock radio.

As discussed, the clock 60 may operate in a stand-alone capacity as an alarm clock or may serve as a controller in an appliance communication and control system of the present invention. As a controller, the clock 60 performs many of the same functions as the console 50. In addition to providing a user interface, the clock 60, like the console 50, provides a communications interface to external networks, such as the telephone network and the Internet, via its telephone connection. Among other functions, the alarm clock 60 can obtain the correct time and software updates by dialing a predetermined telephone number or accessing an appropriate website upon start-up and/or periodically. Once it has obtained the correct time, the alarm clock 60 can cause all of the other devices in the system with clock functions (e.g., coffee maker, stand mixer) to set their clocks accordingly.

Like the console 50, the alarm clock 60, as a system controller preferably has extensive communications capabilities. For example, the alarm clock 60 can preferably be accessed directly over the Internet; it can generate and transmit e-mail alerts over the Internet, etc. In an exemplary embodiment, the alarm clock 60 can access the Internet through a portal that supports a lower protocol, performs the translations required to access the desired information on the Internet through higher level protocols such as TCP/IP, HTML and the like, and also packages gathered information in a form that is most appropriate to send back to the alarm clock. This is similar to what has already been done to support small screen devices such as the 3Com Palm VII, which has a cellular wireless Internet connection capability.

The clock 60 can also be used to display status information for the various devices in the system. For example, if the battery level of a smoke detector 74 has fallen below a safe level, a status message will be sent from the smoke detector (via the PLC/wireless bridge 70) to the clock 60 informing the clock of this condition. The clock 60 can then display a graphic on the display 610 indicating that a smoke detector needs new batteries and identifying the particular smoke detector.

In another typical application, for example, if a smoke detector 74 has detected the presence of smoke, an alarm message will be sent from the smoke detector (via the PLC/wireless bridge 70) to the clock 60 informing the clock of this condition. The clock 60 can then display a graphic on the display 610 indicating that a smoke detector has been activated and identifying the particular smoke detector. The alarm clock 60 can also generate an alarm, synthesized voice message, or the like via its speaker 265. In addition, the alarm clock 60 may place a telephone call to one or more pre-programmed telephone numbers (e.g., monitoring service, user's cell phone) with a synthesized voice message (or coded digital data, if dialing into an automated monitoring service) informing the called party of the alarm condition.

The alarm clock 60 can also perform some of the informational and organizational functions described above in connection with the kitchen console 50, to the extent allowed by the alarm clock's more limited capabilities. For example, the alarm clock 60 can provide access to a proprietary news service, whereby news headlines of interest to the user, local weather and traffic conditions, etc. could be downloaded by the clock during the night so that the user can quickly browse this information on the clock display in the morning upon waking.

Furthermore, the clock can modify its or the system's operation in accordance with the information received. For example, if weather or traffic conditions indicate a longer than normal commute time for the user, the alarm clock can be programmed to automatically wake the user earlier to still be able to arrive at work on time. The alarm clock 60 can also be programmed to advance the activation of the coffee maker 54, accordingly.

Coffee Maker

Figure 8:
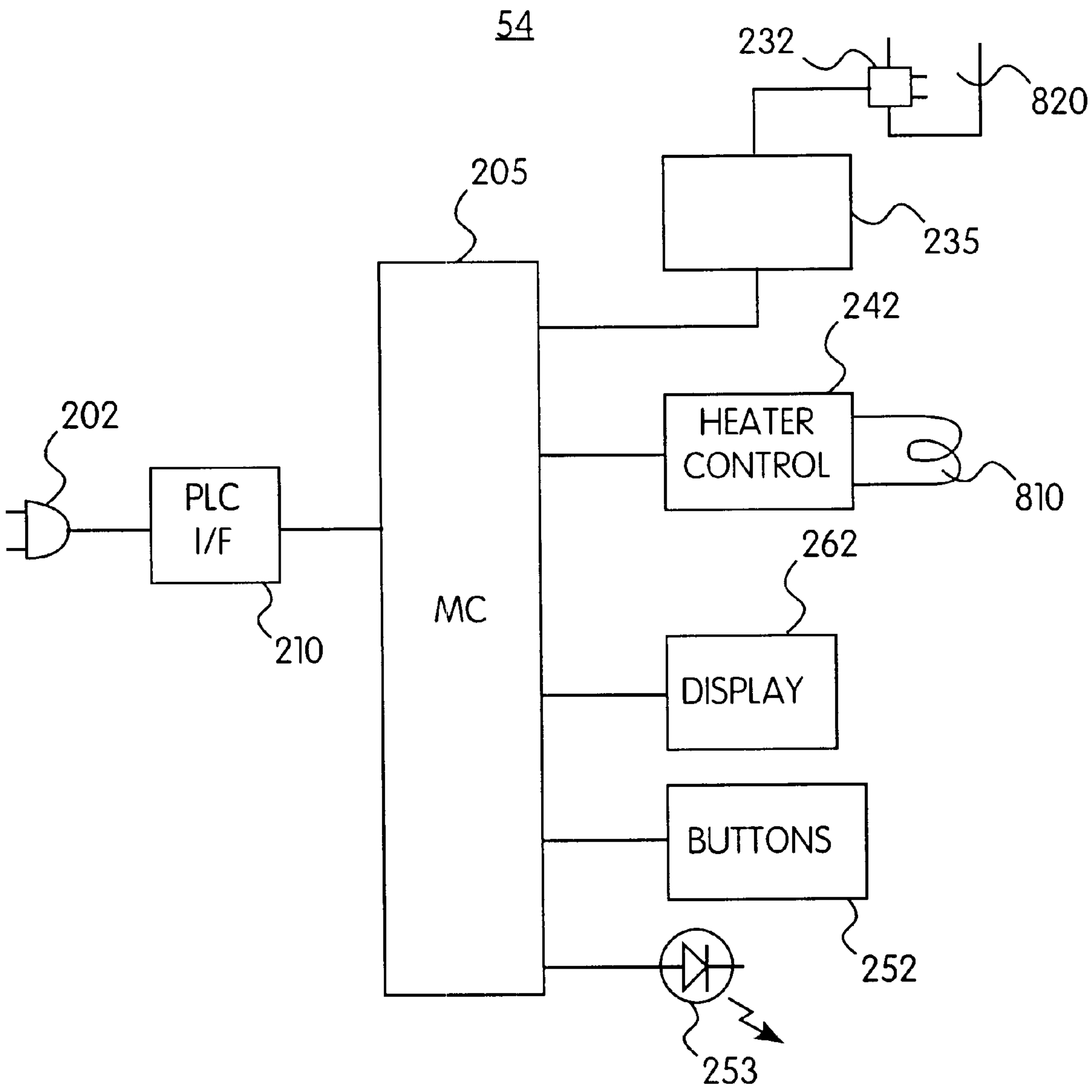
FIG. 8 shows a block diagram of an exemplary embodiment of a hot beverage-brewing device in accordance with the present invention.

FIG. 8 shows a block diagram of an exemplary embodiment of a coffee maker 54 in accordance with the present invention. As shown in FIG. 8, the coffee maker 54 comprises a PLC interface 210 coupled to a microcontroller 205. The microcontroller 205 receives inputs from a set of buttons or switches 252, and controls a display 262.

As with conventional coffee makers, the coffee maker 54 comprises a heater 810 and a water reservoir 820. The heater 810 is powered by heater control circuitry 242 that is controlled by the microcontroller 205. The reservoir 820 is provided with a water sensor 232. The water sensor 232 senses whether there is a predetermined quantity of water in the reservoir 820. The sensor 232 can be implemented in a variety of known ways (e.g., capacitive, conductive, etc.) The sensor 232 is preferably placed at a level in the reservoir 820 which ensures that a desired minimum amount of water (e.g., four cups) is present in the reservoir 820 before a brew cycle is initiated.

In an exemplary embodiment, the sensor 232 comprises two electrical conductors that project into the reservoir 820. The impedance between the conductors varies depending on the presence of water at the conductors. A circuit 235 senses the impedance across the two conductors and provides a binary signal to the microcontroller 205 in accordance with the sensed impedance. The binary signal thus provides an indication of the absence or presence of water in the reservoir 820.

In accordance with messages received via the PLC interface, the microcontroller 205 of the coffee maker can control the activation or deactivation of the heater 810, thus controlling the start or finish of a brewing cycle. Via the PLC interface, the coffee maker 54 can be commanded to immediately begin or end a brew cycle or it may be commanded to begin or end a brew cycle at a specified future time. The microcontroller 205 can transmit messages via the PLC interface 210 indicating the progress of a brewing cycle and the presence of water in the water reservoir 820.

Before initiating a brewing cycle, the coffee maker 54 preferably will take into account the status of the water reservoir. If the coffee maker 54 receives a command via the PLC interface to begin a brewing cycle while the sensor 232 indicates that the reservoir does not contain a minimum amount of water (e.g., four cups), the microcontroller 205 can override the command and keep the heater 810 off. The coffee maker 54 can also transmit a message to the system controller (e.g., console 50) indicating that the water reservoir 820 does not contain the minimum quantity of water and that the requested brew cycle will not be initiated. The system controller, in turn, can indicate the low-water condition to the user, thereby prompting the user to refill the reservoir 820. Once the reservoir is refilled, the brewing cycle request can be automatically reinstated or the user can be required to request the brewing cycle anew.

In an alternative embodiment (not shown) the coffee maker 54 may be coupled to a water source, such as a household water supply line, and may draw water as needed. If the coffee maker receives a command to begin a brew cycle (immediately or at a future time) and the water level in the reservoir is low, the coffee maker can draw water from the supply line to fill the reservoir before beginning the brew cycle. In this embodiment, a solenoid valve (not shown) or the like is included between the water source and the reservoir 820 and is controlled by the microcontroller 205. A second water sensor (not shown) is preferably included at or near the top of the water reservoir 820 and is coupled to the microcontroller 205 so as to inform the microcontroller when the reservoir 820 is full and thus to shut off the solenoid valve.

In yet a further exemplary embodiment, the coffee maker 54 may comprise means for detecting the presence of grounds in the brew basket and for determining if the grounds have already been used. Such means can include a sensor for weighing the brew basket. A brew basket containing used grounds, which are typically wet, weighs more than the brew basket with dry, unused grounds, which in turn weighs more than the brew basket when empty. By thus weighing the brew basket, a determination can be made as to the presence and state (e.g., wet or dry) of grounds in the brew basket.

As with other appliances in accordance with the present invention, the coffee maker 54 can also be operated in a stand-alone mode. A control panel comprising buttons 252 and a display 262 are used for this purpose and thus provide a standard set of functions such as a timer/clock, "ON/OFF", "set delayed brew time", etc. The display 262 may also be used to display status information (e.g. "BREW LATER", "ADD WATER"). The buttons 252 can also be used to override remote PLC control of the coffee maker 54 or to re-program the coffee maker locally.

An additional indicator 253 (or the display 262) can be used to indicate the communications status of the coffee maker 54 over the PLC interface. If there is a controller 50, 59, 60 present on the same wiring 27, the microcontroller 205 will turn on the indicator 253. During actual communication, the microcontroller 205 can cause the indicator 253 to flash. The microcontroller 205 will keep the indicator 253 off if there is no system controller 50, 59, 60 present or if there is an error condition. If there is an error condition, additional information can be provided by the display 262 or on the display of the system controller.

Mixer

Figure 9A:
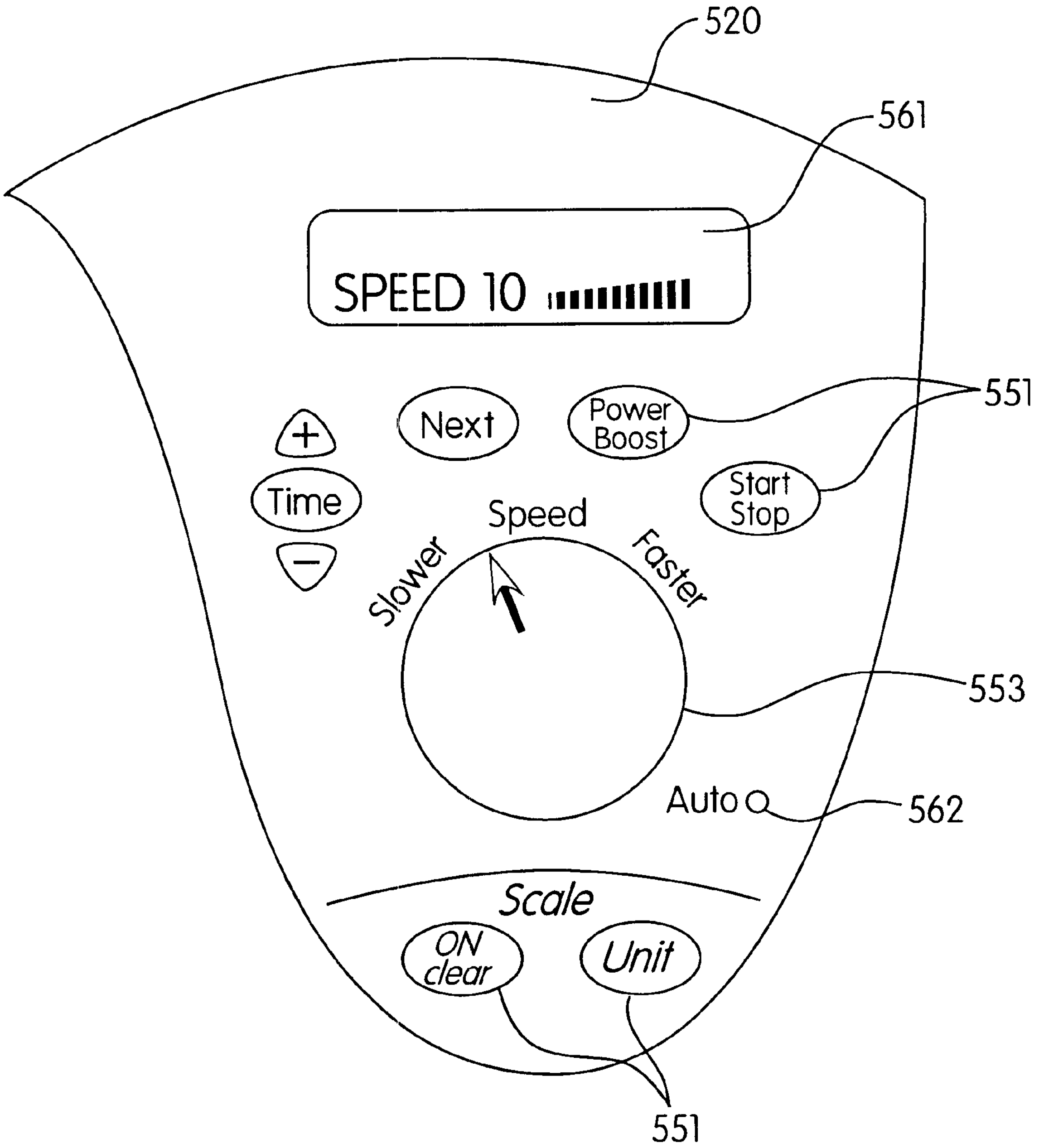
FIGS. 9A and 9B show an exemplary embodiment of a stand mixer device in accordance with the present invention.
Figure 10:
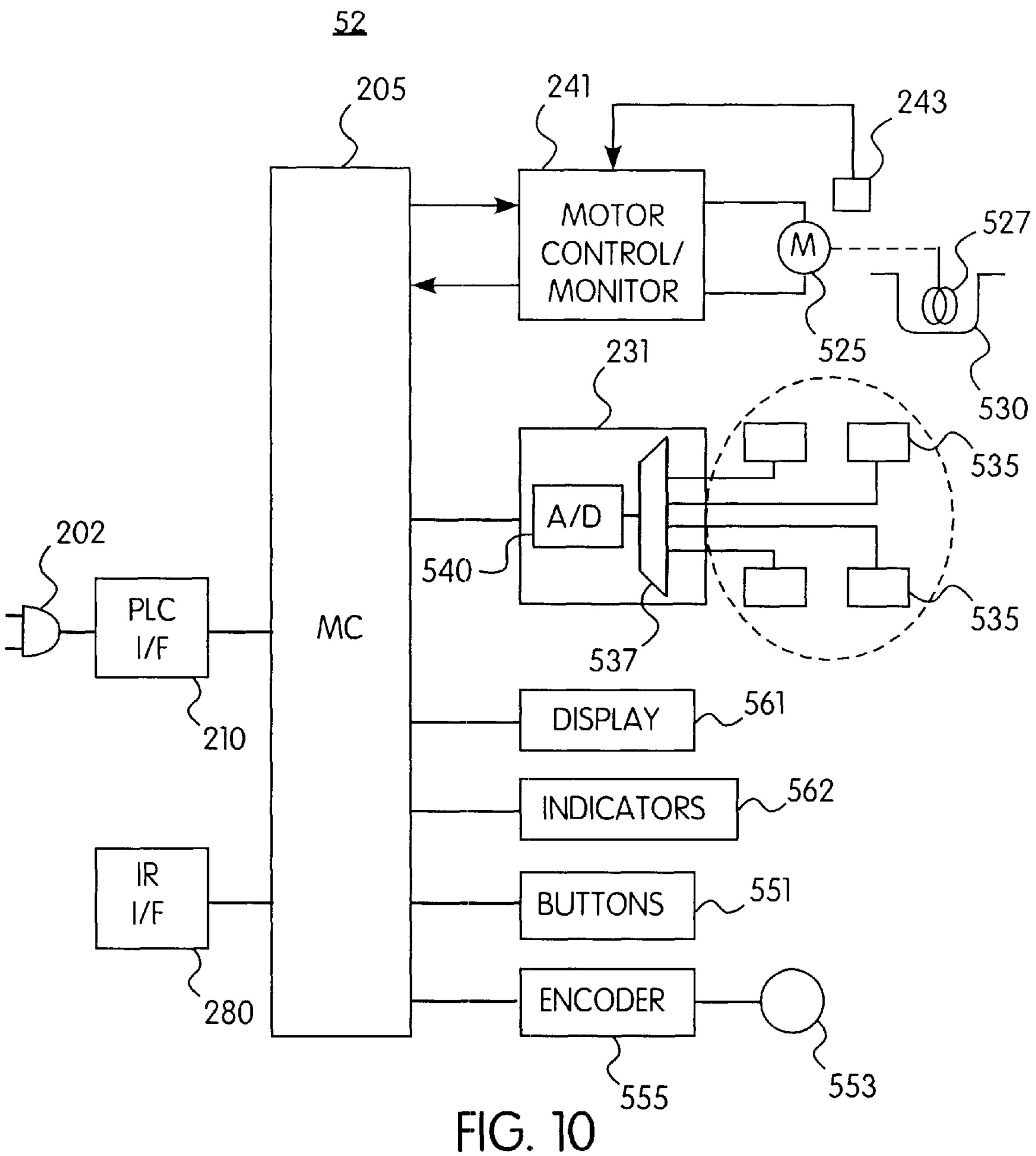
FIG. 10 shows a block diagram of an exemplary embodiment of a stand mixer device in accordance with the present invention.
Figure 9B:
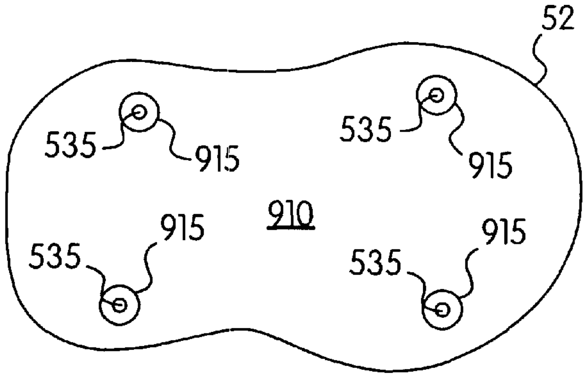

FIGS. 9A, 9B and 10 are directed to an exemplary embodiment of a mixer appliance 52 in accordance with the present invention.

FIG. 9A shows an exemplary control panel 520 for a mixer appliance 52 of the present invention. The control panel 520 comprises a display 561, one or more indicators 562, a plurality of buttons 551 and a dial 553. The mixer 52 can be controlled entirely from the control panel 520, as in a stand-alone mode, from the console 50, as in a control and communications system of the present invention, or via an IR interface 280. The IR interface 280 can be used, for example, to communicate with a PDA. The mixer 52 can also operate in an automatic or manual mode from either the control panel 520 or from the console 50. Typically, however, the mixer 52 will be operated in a manual mode from the control panel 520 and automatically from the console 50.

A schematic block diagram of an exemplary circuit for a mixer appliance 52 is shown in FIG. 10. Like other PLC appliances of the present invention, the mixer 52 comprises a microcontroller 205 coupled to a PLC interface 210. The microcontroller 205 is coupled to and controls the display 561 and indicators 562 on the mixer's control panel 520. The microcontroller 205 is also coupled to and receives inputs from the buttons 551 and the dial 553 on the mixer's control panel. The position of the dial 553 can be detected using a variety of known techniques, such as optical encoding. An encoder 555 is coupled to the microcontroller 205 to provide an indication of the position of the dial 553.

The mixer 52 comprises a motor 525 for driving one or more mixing blades 527, or the like, for processing food material in the mixing bowl 530. The motor 525 is driven by a motor control and monitoring circuit 241 under the control of the microcontroller 205. In an exemplary embodiment, the motor 525 is an alternating current (AC) motor. The motor control circuit 241 monitors the speed of the motor 525 via a tachometer input provided by a sensing device 243, such as a Hall effect device. In accordance with control signals from the microcontroller 205, the motor control circuit 241 controls the speed of rotation of the motor 525 by varying the duty cycle over which power is applied to the motor. The motor control circuit 241 also includes current and back-EMF sensing circuitry to determine the load and torque being produced by the motor. This motor control circuit 241 generates a digital signal indicative of the torque, which signal is provided to the microcontroller 205. The speed control and torque sensing features of the control circuit 241 can be implemented in known ways.

The microcontroller 205 can control the mixer motor 525 in accordance with inputs to the control panel 520, messages received by the mixer over the PLC and IR interfaces or a program being executed by the microcontroller. For example, a user, via the control panel 520 can manually start or stop the mixer motor or specify a duration of operation and can also set the speed of operation using the dial 553. Via the control panel 520, console 50 or PDA, a user can access a timer function that allows the user to specify a start and stop time or a start time and a duration of operation. The timer function allows the user to set up the mixer 52 to perform a lengthy mixing process (e.g., beat eggs for 15 minutes), while freeing the user to perform other tasks without requiring the user's attention to the state of the mixer.

Messages from the console 50 received over the PLC or IR interface can command the mixer motor to start immediately or at some future time or to stop immediately or at some future time, and can also specify a speed setting (if none specified, the dial setting or some default setting can be used). Even while the mixer is under the control of the console 50, the dial 553 can be used to fine-tune the speed of the mixer motor 525 about the speed specified by the console 50. The user may override the remotely set power level or mix timer by manually adjusting the level control or timer settings, even while the mix cycle is progressing.

To prevent inadvertent starting of the mixer (either remotely or locally), the mixer 52 may also be configured so as not to allow programming of the mixer to start at some future time. It may also be desirable not to allow any starting of the mixer remotely, such as from the console 50.

The microcontroller 205 can also provide a soft start/stop feature to prevent splatter and to improve the longevity of the motor 525 and the components driven thereby. The microcontroller 205, via the control circuit 241, can gradually ramp-up or ramp-down the speed of the motor 525 in accordance, for example, with a speed profile stored in the mixer's memory.

Providing the microcontroller 205 with torque information for the motor 525 allows the microcontroller to detect a variety of conditions and to control the motor 525 accordingly. For example, if the mixer blade 525 is jammed due to an obstruction, the current drawn by the motor 525 will rise rapidly. Upon detecting this condition, the microcontroller 205 can control the motor control circuitry 241 to remove power from the motor 525.

The torque information can also be used to detect changes in the condition of the material being mixed. For example, the mixer 52 may be in the process of executing a recipe step (e.g., "MIX UNTIL A UNIFORM CONSISTENCY") that has been downloaded from the console 50 to the mixer over the PLC interface or input locally via the mixer's control panel 520. Until a uniform consistency is achieved, the torque of the motor 525 will vary over some initial range as the mixer blades 527 randomly encounter areas within the material having different consistencies. Once uniform consistency has been achieved, however, the torque of the motor 525 and thus the current drawn by the motor will become relatively constant. Upon detection of this condition (e.g., by comparing successive current measurements), the microcontroller 205 can control the motor 525 to stop.

The exemplary mixer of FIGS. 9–10 includes a weight measurement capability. As shown in FIG. 9B, a plurality of weight sensors 535 is arranged on the base 910 of the mixer 52. In the exemplary embodiment shown, a sensor 535 is arranged between the base 910 and each of four feet 915 arranged on the base 910 of the mixer. A variety of pressure sensitive sensors such as piezoelectric sensors, strain gauges, load cells or load cells with integral strain gauges can be used for the sensors 535. Moreover, different numbers of sensors (e.g., one or more) and arrangements of sensors are possible. Known weighing arrangements and components such as are used in conventional digital scales can also be used.

The signals generated by the sensors 535 are processed by a circuit 231 which generates a digital signal representative of the weight sensed by the sensors at the base of the mixer. In an exemplary embodiment, the circuit 231 comprises an analog multiplexer 537 and a 22-bit A/D converter 540 which provides the microcontroller 205 with periodic samples of the weight measured at each of the four sensors 535. The microcontroller 205 adds the four measurements to obtain a total weight of the mixer 52 (including the contents of the mixing bowl 530). To reduce the effects of mechanical and electrical noise, the microprocessor 205 preferably adds the readings and averages and filters successive readings. The optimum sample rate and filter specifications depend on the mechanical and electrical specifics of the appliance.

The provision of weight information to the microcontroller 205 can be used for a variety of purposes. In one mode, a user can initiate an operation to weigh a batch of material by pressing a button 551 (e.g., "ON/Clear") on the control panel 520. The microcontroller 205 determines the sensed weight at the time of the button press (the "initial weight") and zeros the scale reading displayed on the display 561. As the user adds the material to be weighed to the mixing bowl 530, the display 561 provides a running display of the currently measured weight above the zero setting (i.e., the initial weight, the weight that was measured the last time the "ON/Clear" button was pressed). An additional button (e.g., "Units") allows the user to select English or metric units of measurement.

In another operating mode, the weighing function may be used in carrying out a step of a recipe. For example, a recipe downloaded from the Internet by the kitchen console 50 may include a step such as "ADD TWO CUPS OF BROWN SUGAR". Using a database of densities of commonly used ingredients, the kitchen console 50 looks up or calculates the weight of two cups of brown sugar and provides that information along with the recipe step to the mixer 52 over the PLC interface. The mixer 52 may also be capable of storing a smaller database of the more commonly used ingredients in order to perform such a conversion calculation when used in a stand-alone mode. Upon receiving the recipe step message from the console 50, the mixer first obtains an initial weight measurement using the sensors 535, and then prompts the user, via the display 561, to pour two cups of brown sugar into the mixing bowl 530. As the user pours the brown sugar into the mixing bowl, the display 561 provides a running indication of how much of the two cups of brown sugar the user has poured using an appropriate graphic representation such as a bar graph, pie chart and/or a numerical indication (e.g., percentage, weight, cups, etc.) Once the user has added the amount called for by the recipe step (e.g., two cups), an appropriate indication is generated to prompt the user to stop adding more of the ingredient. For multiple ingredients, the above procedure is repeated, with the scale zeroed between ingredients by the user or automatically (upon reaching the specified weight). When all ingredients called for by the recipe step have been added, the mixer 52 can then transmit a message to the console 50 that the recipe step has been completed. The console 50 can add a check mark next to the completed recipe step on its display and send the next recipe step to the mixer 52.

The weighing feature of the mixer 52 can be used for a variety of purposes not limited to the aforementioned. For example, with the mixing bowl removed or with an appropriately adapted tray inserted, the mixer 52 can be used as a postal scale.

Electric Blanket

Figure 11:
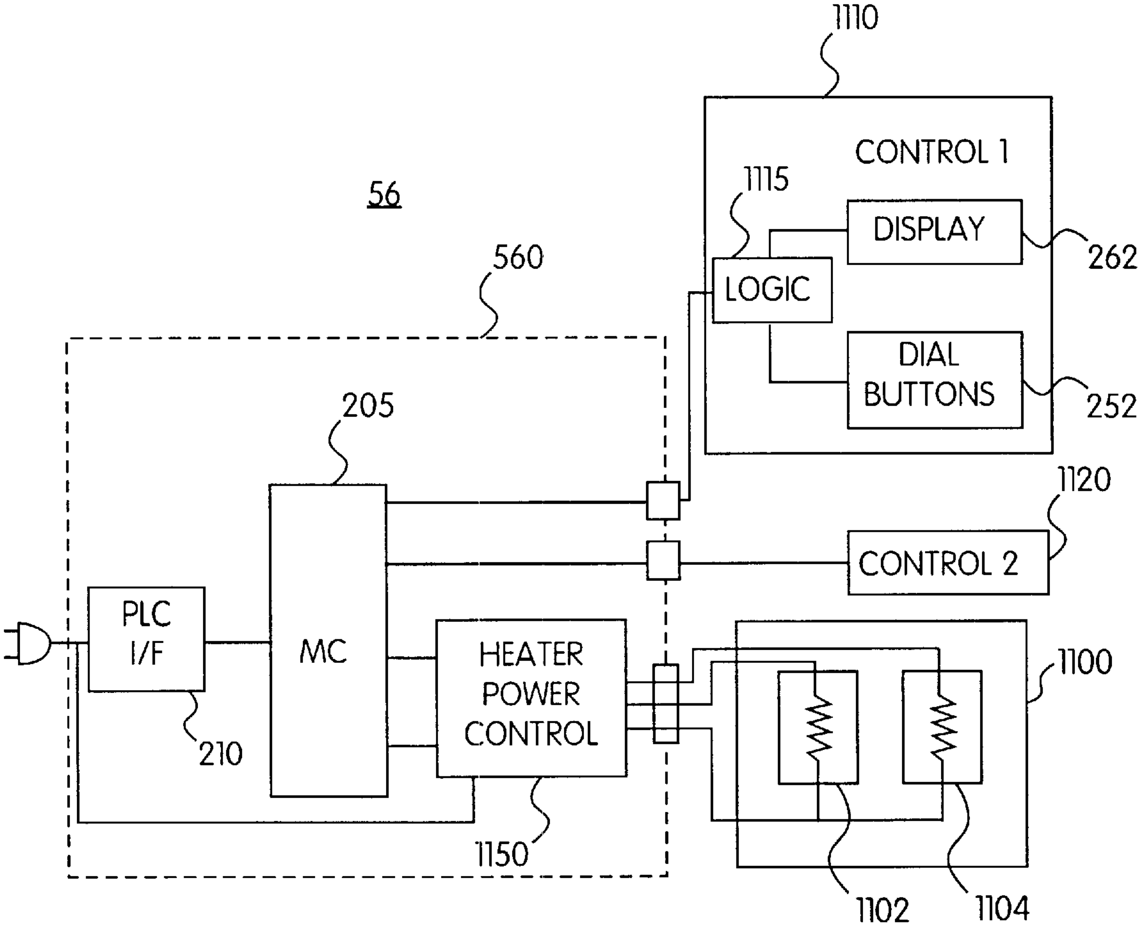
FIG. 11 shows a block diagram of an exemplary embodiment of a heating blanket device in accordance with the present invention.

FIG. 11 shows a block diagram of an exemplary heating blanket appliance 56 in accordance with the present invention. The exemplary heating blanket appliance of FIG. 11 comprises an interface module 560, a dual-heating element blanket 1100, and two controllers 1110, 1120, one for each heating element 1102, 1104 of the blanket 1100. The interface module 560 comprises a PLC interface 210, a microcontroller 205 and a heater power control circuit 1150. The heater power control circuit 1150 controls the application of power to each of the heating elements 1102 and 1104 in accordance with control signals from the microcontroller 205. The microcontroller 205 can control the heating level of each element 1102, 1104 by varying the duty cycle of the respective control signal.

The microcontroller 205 is coupled to the controllers 1110 and 1120 and controls the heating elements 1102 and 1104 in accordance with signals received from the controllers 1110 and 1120. In a further embodiment, the controllers 1110, 1120 (or the alarm clock 60, when acting as a blanket controller, as described below) may comprise temperature sensors (e.g., thermistors) to sense ambient temperature. The ambient temperature thus sensed can be used to maintain a more consistent temperature (particularly in an open-loop system where the blanket does not have a temperature sensor).

Each controller 1110, 1120 includes one or more buttons (e.g., ON/OFF, PREHEAT) and/or a dial 252 for controlling the activation and the temperature setting of the respective heating element 1102, 1104. Each controller also includes a display 262 and logic circuitry 1115. The display 262 can be implemented with a backlit LCD. The logic circuitry 1115 monitors the states of the buttons and dial 252 and controls the display 262 in accordance with the states of buttons and dial 252 and/or in accordance with signals from the interface module 560. Thus, for example, the display 262 can be used to display a desired temperature setting as selected with the dial. The logic circuitry 1115 also communicates the button and dial information to the microcontroller 205, which controls the heater power control circuitry 1150 accordingly.

In a preferred embodiment, the controllers 1110, 1120 are each coupled to the interface module 560 via a four-wire "I2C" serial interface (power, data, clock and ground), although a wireless interface (e.g., RF, IR) can also be used. Advantageously, since the controllers do not require a substantial amount of power, the four-wire interface can be implemented with thin wire. The logic circuitry 1115 can be implemented using discrete logic components, a logic ASIC or a simple microcontrbller.

The microcontroller 205 can send and receive messages from a system controller, such as the alarm clock 60, via the PLC interface 210. The microcontroller 205 can thus communicate to the alarm clock 60 the activation state (i.e., on or off) of each heating element 1102, 1104 and the temperature setting of each. The alarm clock 60 can display the state and setting of each heating blanket element. The system controller 50, 59, 60 can also use the electric blanket activation and setting information, for example, to control a thermostat 78 of the HVAC system so as to reduce the ambient heat when the electric blanket heating elements are on, or vice versa. Conversely, the system controller can use temperature and activation information from the thermostat 78 to control the activation and/or setting of the electric blanket heating elements. In a further embodiment, the electric blanket interface unit 560 can communicate directly with the thermostat 78 (e.g., via an RF link) without the need for a system controller.

The microcontroller 205 can also control the heating elements 1102, 1104 in accordance with command messages received from the alarm clock 60. The command messages can specify that each element 1102, 1104 be turned on or off immediately or at some future time and can also specify the level at which to set each element. The controllers 1110 and 1120 thus can be eliminated and the user can input the desired heating blanket settings at the alarm clock 60.

In a preferred embodiment, the heating blanket appliance 56 includes a pre-heat feature for each of the heating elements 1102, 1104. When the pre-heat feature is activated for a heating element, the respective heating element is energized at an elevated level (e.g., maximum, or several steps above the last setting) for a selected time period. At the end of this time period, the heating element will be energized at its selected setting as set via the respective controller 1110, 1120 or via the alarm clock 60. The pre-heat feature can be activated by pressing a dedicated button 252 on a controller 1110, 1120 or via the alarm clock 60. In an exemplary embodiment, the duration of the pre-heat time period can be selected by repeatedly pressing the pre-heat key on the controller 1110, 1120 causing the display on the controller to step through a sequence of time choices until the desired choice is displayed.

Breadmaker

Figure 18A:
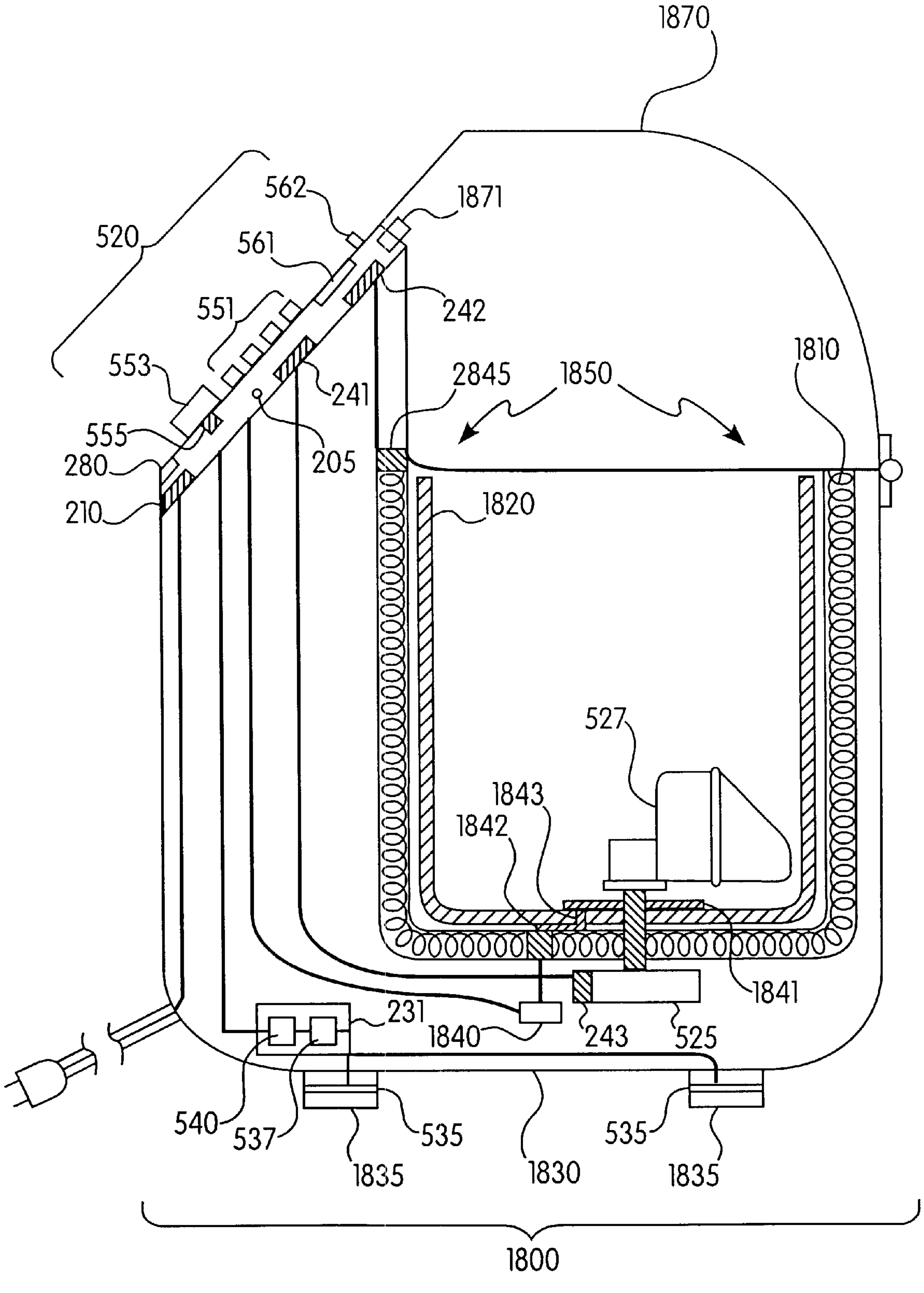
FIGS. 18A–18C show an exemplary embodiment of a breadmaker in accordance with the present invention.

FIG. 18A shows an exemplary embodiment of a breadmaker 1800 according to the present invention. Breadmaker 1800 may comprise a heating chamber 1850 in connection with a PLC interface 210 coupled to a microcontroller 205. The microcontroller 205 receives inputs from a set of buttons or switches 551, and controls a display 561.

As with conventional breadmakers, the breadmaker 1800 may comprise a heater 1810, a dough pan 1820, and a sealable lid 1870. The heater 1810 may be located in heating chamber 1850 and may be powered by heater control circuitry 242, which is controlled by the microcontroller 205. Heater control circuitry 242 may include a thermostat 1845 to monitor and regulate the temperature of the heating chamber 1850. In accordance with messages received via the PLC interface, the microcontroller 205 of the breadmaker 1800 can control the activation or deactivation of the heater 1810 within heating chamber 1850, thus controlling the start or finish of a cooking cycle. Via the PLC interface, the breadmaker 1800 can be commanded to immediately begin or end a cook cycle or it may be commanded to begin or end a cook cycle at a specified future time. The microcontroller 205 can transmit messages via the PLC interface 210 indicating the progress of a cooking cycle.

Figure 18B:
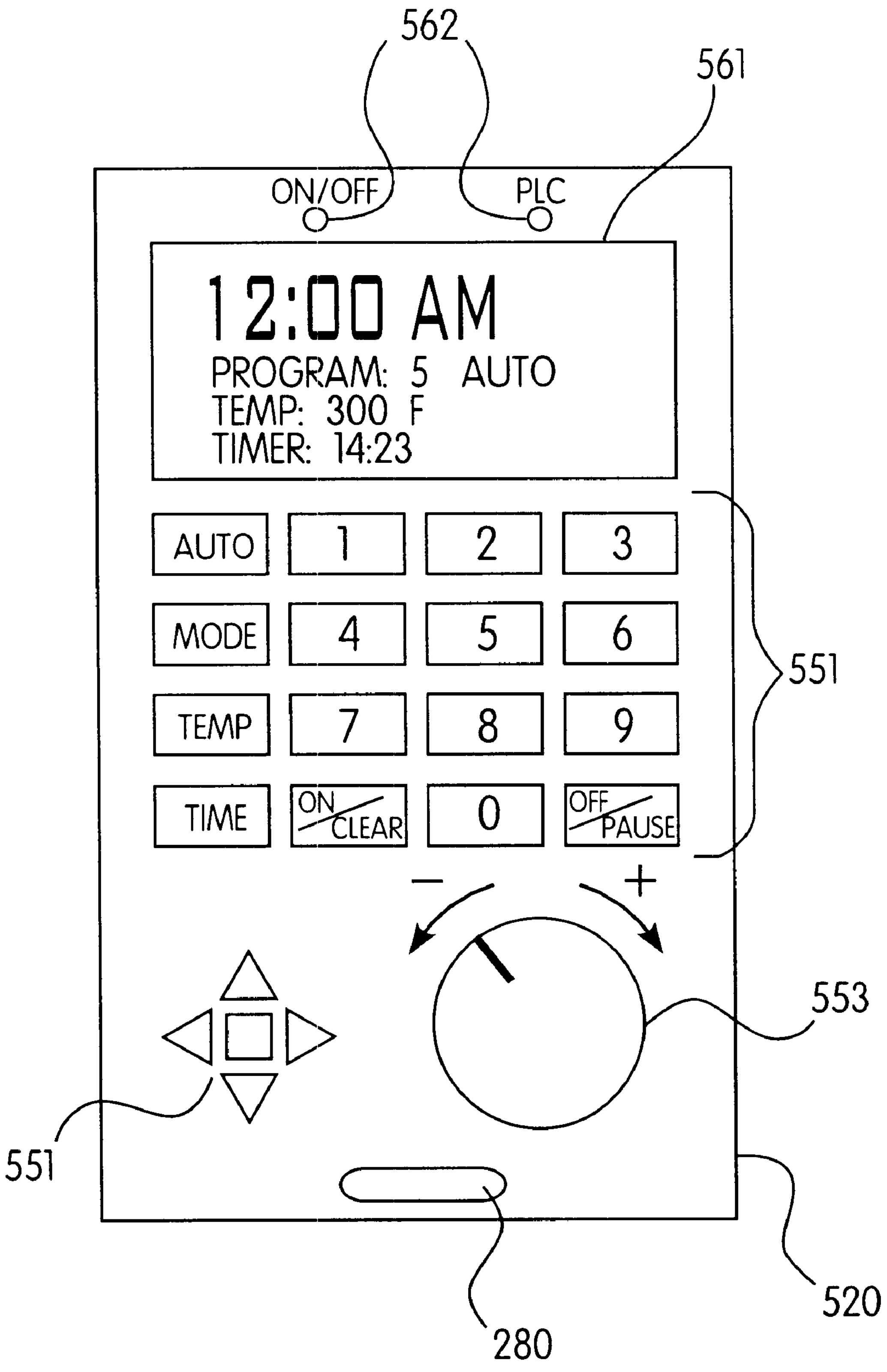

FIG. 18B shows an exemplary control panel 520 for a breadmaker 1800 of the present invention. The control panel 520 comprises a display 561, one or more indicators 562, a plurality of buttons 551 and a dial 553. As with other appliances in accordance with the present invention, the breadmaker 1800 can be controlled entirely from the control panel 520 in a stand-alone mode. Additionally, the breadmaker 1800 can be operated from the console 50, as in a control and communications system of the present invention, or via an IR interface 280. The IR interface 280 can be used, for example, to communicate with a PDA. The breadmaker 1800 can also operate in an automatic or manual mode from either the control panel 520 or from the console 50.

Typically, however, the breadmaker 1800 will be operated automatically from the console 50 and manually from the control panel 520. A control panel 520 comprising buttons 551 and a display 561 are used for this purpose and thus provide a standard set of functions such as a timer/clock, "ON/OFF", "set delayed cook time", etc. The display 561 may also be used to display status information (e.g., "COOK LATER", "ADD DOUGH"). The buttons 551 can also be used to override remote PLC control of the breadmaker 1800 or to re-program the breadmaker locally.

An additional indicator 562 (or the display 561) can be used to indicate the communications status of the breadmaker 1800 over the PLC interface. If there is a controller 50, 59, 60 present on the same wiring 27, the microcontroller 205 will turn on the indicator 562. During actual communication, the microcontroller 205 can cause the indicator 562 to flash. The microcontroller 205 will keep the indicator 562 off if there is no system controller 50, 59, 60 present or if there is an error condition. If there is an error condition, additional information can be provided by the display 561 or on the display of the system controller.

Figure 18C:
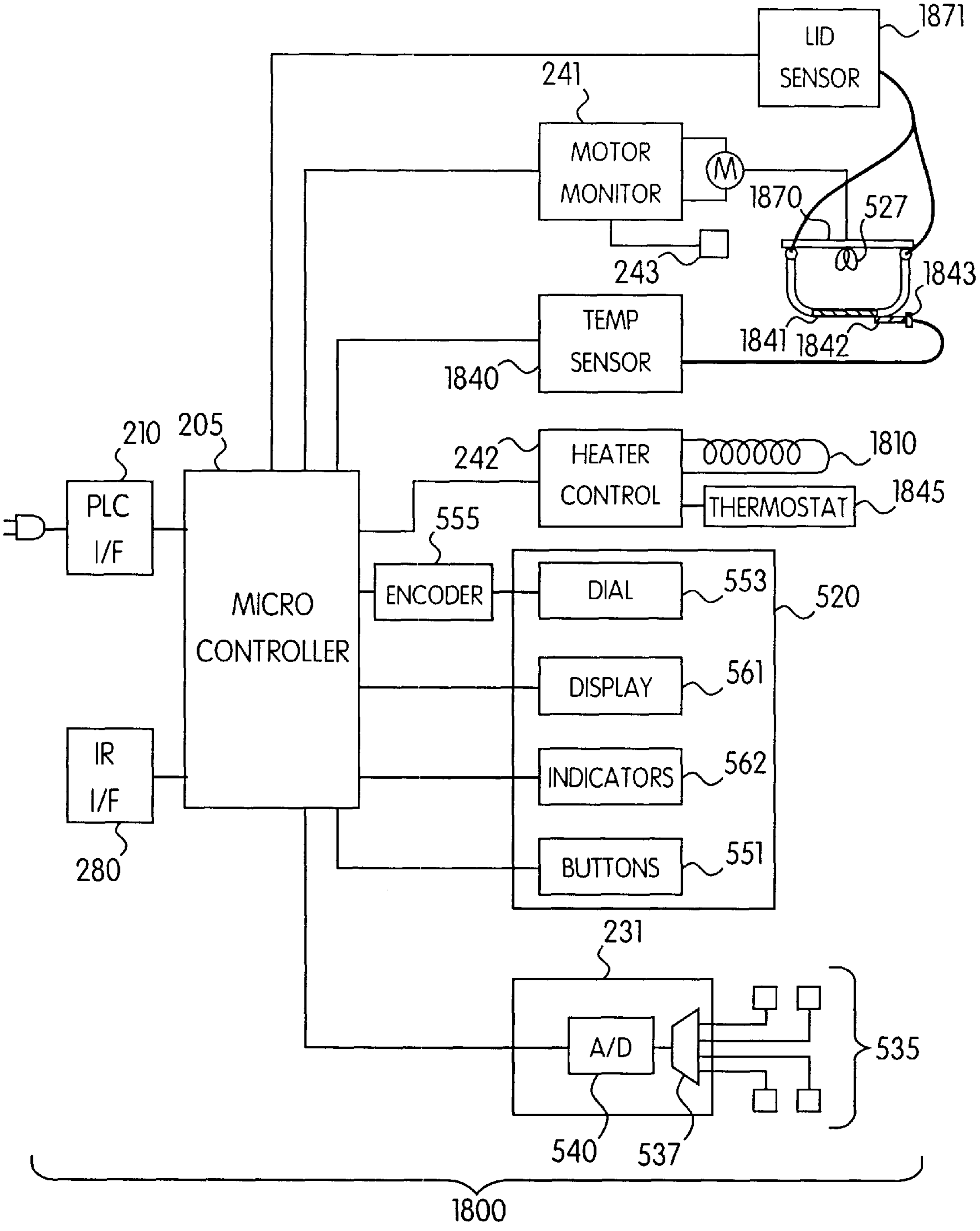

A schematic block diagram of an exemplary circuit for a breadmaker 1800 is shown in FIG. 18C. Like other PLC appliances of the present invention, the breadmaker 1800 comprises a microcontroller 205 coupled to a PLC interface 210. The microcontroller 205 is coupled to and controls the heater control circuitry 242, a motor control and monitoring circuit 241, the display 561 and the indicators 562 on the breadmaker's control panel 520. The microcontroller 205 is also coupled to and receives inputs from the motor control and monitoring circuit 241, the buttons 551 and the dial 553 on the breadmaker's control panel. The microcontroller 205 also may be coupled to and receive input from optional weight sensors 535, optional lid sensor 1871, and temperature sensor 1840. The position of the dial 553 can be detected using a variety of known techniques, such as optical encoding. An encoder 555 is coupled to the microcontroller 205 to provide an indication of the position of the dial 553.

The breadmaker 1800 may comprise a motor 525 for driving one or more kneading paddles 527, or the like, for kneading dough in the dough pan 1820. The motor 525 is driven by a motor control and monitoring circuit 241 under the control of the microcontroller 205. In an exemplary embodiment, the motor 525 is an alternating current (AC) motor. The motor control circuit 241 may monitor the speed of the motor 525 via a tachometer input provided by a sensing device 243, such as a Hall effect device. In accordance with control signals from the microcontroller 205, the motor control circuit 241 may control the speed of rotation of the motor 525 by varying the duty cycle over which power is applied to the motor. The motor control circuit 241 also may include current and back-EMF sensing circuitry to determine the load and torque being produced by the motor. This motor control circuit 241 may generate a digital signal indicative of the torque, which signal is provided to the microcontroller 205. The speed control and torque sensing features of the control circuit 241 can be implemented in known ways.

The microcontroller 205 can control the breadmaker heater 1810 and motor 525 in accordance with inputs to the control panel 520, messages received by the breadmaker over the PLC and IR interfaces or a program being executed by the microcontroller. For example, via the control panel 520, a user can manually start or stop the breadmaker heater and motor, specify a duration of operation of both, and set the temperature of the heater and the speed of operation of the motor using, for example, the dial 553. Also via the control panel 520, console 50 or PDA, a user can access timer functions which allow the user to specify a start and stop time or a start time and a duration of operation of the heater and motor. The timer functions allow the user to set up the breadmaker 1800 to perform a lengthy kneading process or cooking cycle, while freeing the user to perform other tasks without requiring the user's attention to the state of the breadmaker.

Messages from the console 50 received over the PLC or IR interface can command the breadmaker heater or motor to start immediately or at some future time or to stop immediately or at some future time, and can also specify a temperature or speed setting (if none specified, the dial setting or some default setting can be used). Even while the breadmaker is under the control of the console 50, the dial 553 can be used to fine-tune the temperature of the heater 1810 or the speed of the breadmaker motor 525, about the levels specified by the console 50. The user may override the remotely set power levels, knead timer, or cook timer by manually adjusting the level control or timer settings, even while the knead or cook cycle is progressing. However, the controller may be programmed to prevent the user from altering the appliance instructions set forth in a recipe while a meal is being prepared, so as to prevent the user from causing the meal to be incorrectly cooked.

The microcontroller 205 can also provide a soft start/stop feature to prevent splatter and to improve the longevity of the motor 525 and the components driven thereby. The microcontroller 205, via the control circuit 241, can gradually ramp-up or ramp-down the speed of the motor 525 in accordance, for example, with a speed profile stored in the breadmaker's memory.

Providing the microcontroller 205 with torque information for the motor 525 allows the microcontroller to detect a variety of conditions and to control the motor 525 accordingly. For example, if the kneading paddle 527 is jammed due to an obstruction, the current drawn by the motor 525 will rise rapidly. Upon detecting this condition, the microcontroller 205 can control the motor control circuitry 241 to remove power from the motor 525.

Optionally, an exemplary breadmaker may include a weight measurement capability. As shown in FIG. 18A, a plurality of weight sensors 535 may be arranged on the base 1830 of the breadmaker 1800. In the exemplary embodiment shown, a sensor 535 may be arranged between the base 1830 and each of four feet 1835 arranged on the base 1830 of the breadmaker. A variety of pressure sensitive sensors such as piezoelectric sensors, strain gauges, load cells or load cells with integral strain gauges can be used for the sensors 535. Moreover, different numbers of sensors (e.g., one or more) and arrangements of sensors are possible. Known weighing arrangements and components such as are used in conventional digital scales can also be used.

The signals generated by the sensors 535 may be processed by a circuit 231 which generates a digital signal representative of the weight sensed by the sensors at the base of the breadmaker. In an exemplary embodiment, the circuit 231 comprises an analog multiplexer 537 and a 22-bit A/D converter 540 which provides the microcontroller 205 with periodic samples of the weight measured at each of the four sensors 535. The microcontroller 205 would add the four measurements to obtain a total weight of the breadmaker 1800 (including the contents of the dough pan 1820). To reduce the effects of mechanical and electrical noise, the microprocessor 205 preferably would add the readings and averages and filters successive readings. The optimum sample rate and filter specifications would depend on the mechanical and electrical specifics of the appliance.

The provision of weight information to the microcontroller 205 can be used for a variety of purposes. In one mode, a user can initiate an operation to weigh a batch of material by pressing a button 551 (e.g., "ON/Clear") on the control panel 520. The microcontroller 205 would determine the sensed weight at the time of the button press (the "initial weight") and zero the scale reading displayed on the display 561. As the user adds the material to be weighed to the dough pan 1820, the display 561 would provide a running display of the currently measured weight above the zero setting (i.e., the initial weight, the weight that was measured the last time the "ON/Clear" button was pressed). An additional button (e.g., "Units") may allow the user to select English or metric units of measurement.

In another operating mode, the weighing function might be used in carrying out a step of a recipe. For example, a bread recipe downloaded from the Internet by the kitchen console 50 may include a step such as "ADD TWO CUPS OF BROWN SUGAR". Using a database of densities of commonly used ingredients, the kitchen console 50 could look up or calculate the weight of two cups of brown sugar and provide that information along with the recipe step to the breadmaker 1800 over the PLC interface. The breadmaker 1800 also might be capable of storing a smaller database of the more commonly used ingredients in order to perform such a conversion calculation when used in a stand-alone mode. Upon receiving the recipe step message from the console 50, the breadmaker first might obtain an initial weight measurement using the sensors 535, and then may prompt the user, via the display 561, to pour two cups of brown sugar into the dough pan 1820. As the user pours the brown sugar into the dough pan, the display 561 would provide a running indication of how much of the two cups of brown sugar the user has poured using an appropriate graphic representation such as a bar graph, pie chart and/or a numerical indication (e.g., percentage, weight, cups, etc.). Once the user has added the amount called for by the recipe step (e.g., two cups), an appropriate indication may be generated to prompt the user to stop adding more of the ingredient. For multiple ingredients, the above procedure could be repeated, with the scale zeroed between ingredients by the user or automatically (upon reaching the specified weight). When all ingredients called for by the recipe step have been added, the breadmaker 1800 could then transmit a message to the console 50 that the recipe step has been completed. The console 50 could add a check mark next to the completed recipe step on its display and send the next recipe step to the breadmaker 1800.

Before initiating a cooking cycle, the breadmaker 1800 optionally will take into account the status of a dough pan 1820 and the lid 1870. For example, lid 1870 may have a lid sensor 1871 coupled to microcontroller 205 that detects whether the lid is sealed. If the breadmaker 1800 were to receive a command via the PLC interface to begin a cooking cycle while the sensors 535 were to indicate that the dough pan 1820 does not contain a minimum amount of dough or that sensor 1871 were to indicate that the lid is open, the microcontroller 205 could override the command and keep the heater 1810 off. The breadmaker 1800 also might transmit a message to the system controller (e.g., console 50) indicating that the dough pan 1820 does not contain the minimum quantity of dough and/or that the lid is not sealed, and that the requested cooking cycle will not be initiated. The system controller, in turn, could indicate the open-lid and/or low-dough conditions to the user, thereby prompting the user to refill the dough pan 1820 and/or seal the lid. Once the pan 1820 were refilled and the lid sealed, the cooking cycle request automatically could be reinstated or the user could be required to request the cooking cycle anew.

In yet a further exemplary embodiment, the breadmaker 1800 may comprise means for detecting the presence of dough in the dough pan 1820 and for determining if the dough has already been cooked. Such means could include a sensor 535 for weighing the dough pan in combination with a temperature sensor 1840. Temperature sensor 1840 may be, for example, a thermistor in contact, for example, with dough pan 1820. Dough pan 1820 may include a thermoconductive coil 1841 plated to the inside of the pan. An exposed end 1842 of the coil 1841 may lead through the pan 1820 so that a thermal contact 1843 touches the exposed end 1842 when the pan is properly in place. Thermal contact 1843 may be affixed to a side of heating chamber 1850 of breadmaker 1800 and may be connected to the temperature sensor 1840.

Thus, by weighing the dough pan, a determination could be made as to the presence of dough in the dough pan, and by measuring the temperature of the dough, a determination could be made as to whether it has been recently heated. Temperature sensor 1840 also may be used in determining the temperature of the dough during a cooking cycle. Based on the cooking temperature of the dough, the cooking cycle might be adjusted for best results.

The weighing feature of the breadmaker 1800 can be used for a variety of purposes not limited to the aforementioned. For example, with the dough pan 1820 removed or with an appropriately adapted tray inserted, the breadmaker 1800 can be used as a postal scale. As mentioned, the weight measurement feature is optional. It is possible, for example, to provide a lower-cost breadmaker 1800 in accordance with the present invention which does not include such a feature.

Also, the console may keep a log of the use of the breadmaker, from which it can infer the state of the dough. The log may be used with or without the input from sensors 535 and 1840. However, in the event that sensors 535 and 1840 were included, the log could make a more intelligent estimation as to state of the dough. For example, after having logged a cooking cycle, if weight and temperature sensors were to indicate the removal of a warm, full dough pan, replacement by a warm empty dough pan, and then further replacement by a warm full dough pan, the console might infer that the contents of the full dough pan have not yet been cooked despite their warm temperature, because the pre-heated dough pan had been emptied since the last cooking cycle.

While reference has been made to a breadmaker 1800 in particular, the invention also encompasses an oven in the general sense. The elements that apply to a breadmaker largely apply to either a convection oven or a microwave oven. For instance, the motor may drive a turntable or skewer instead of a kneading paddle. Depending on the nature of the installation, a convection or microwave oven may not be able to make good use of the weighing capabilities, which consequently may be left out.

Slow Cooker

Figure 19A:
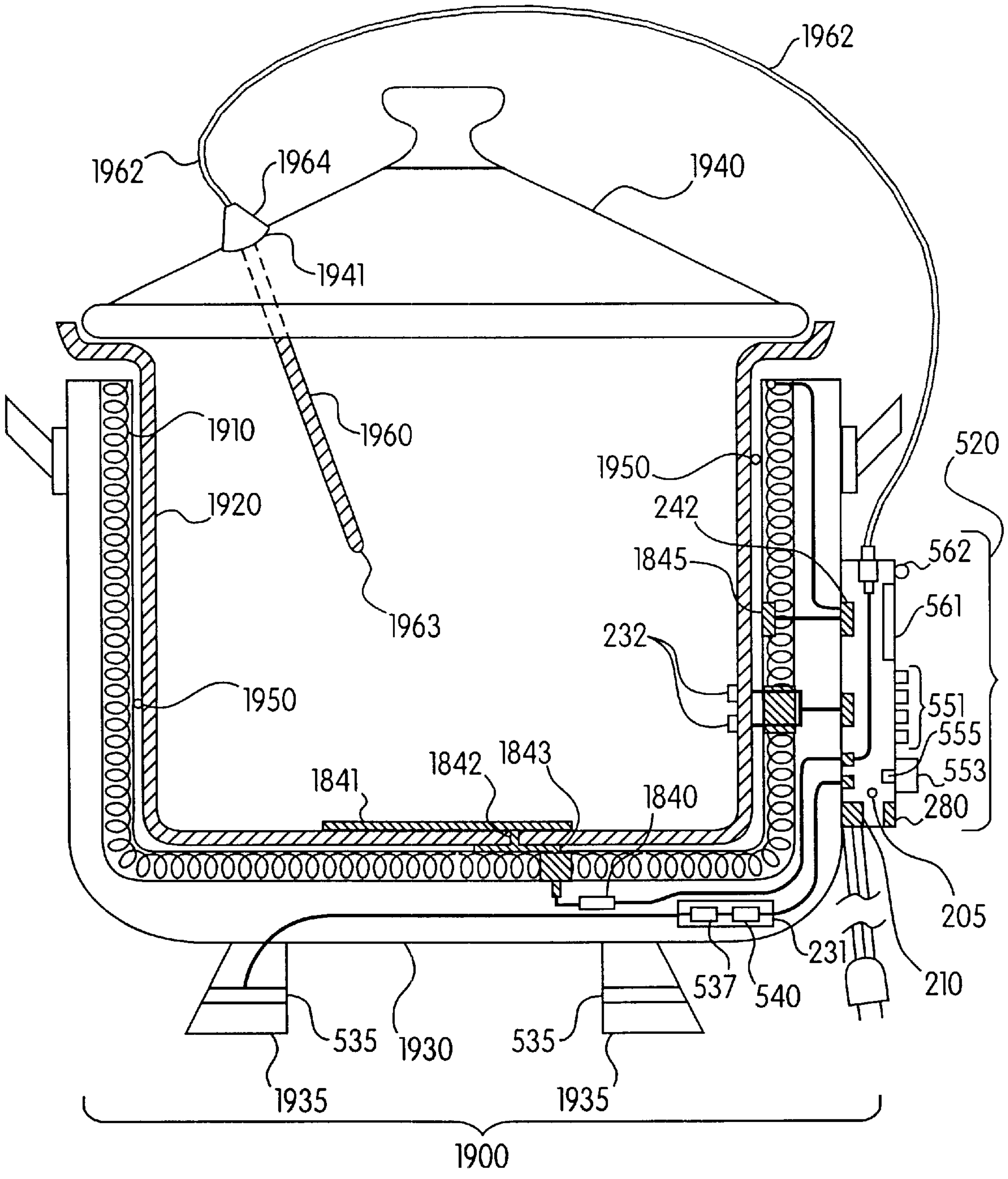
FIGS. 19A–19B show an exemplary embodiment of a slow cooker in accordance with the present invention.
Figure 19B:
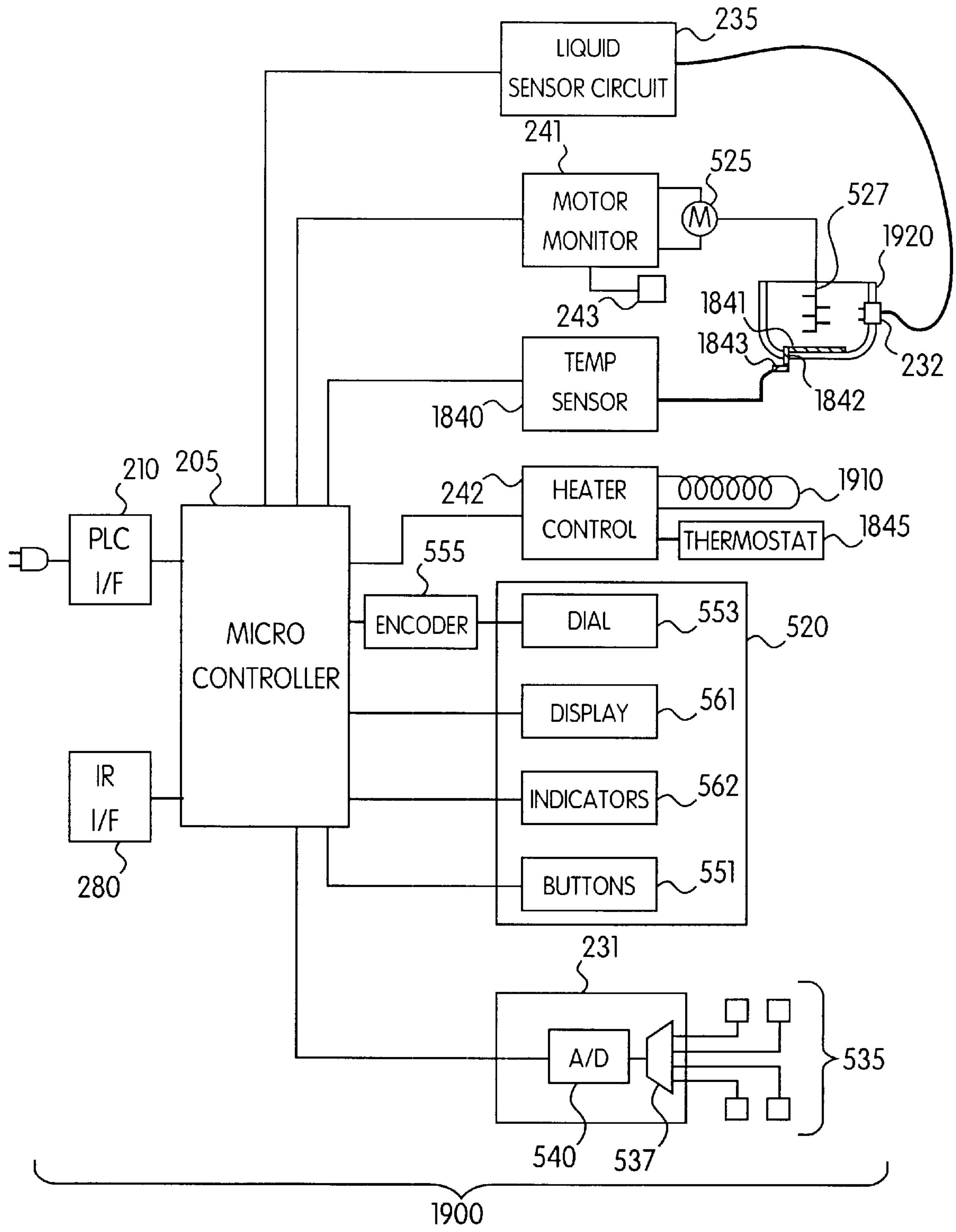

FIGS. 19A–19B show an exemplary embodiment of a slow cooker 1900 according to the present invention. Slow cooker 1900 comprises a PLC interface 210 coupled to a microcontroller 205. The microcontroller 205 receives inputs from a set of buttons or switches 551, and controls a display 561.

As with conventional slow cookers, the slow cooker 1900 may comprise a heater 1910, a pot insert 1920 and a lid 1940. The lid 1940 may be made of any suitable, temperature-resistant material, and preferably is made of glass. The heater 1910 may be powered by heater control circuitry 242, which could be controlled by the microcontroller 205. Heater control circuitry 242 may include a thermostat 1845 to monitor and regulate the temperature of the pot insert 1920. The pot insert 1920 may be provided with an optional liquid sensor 232 and a temperature sensor 1840. In the interest of affordability or simplicity, the liquid sensor 232 may be omitted.

Temperature sensor 1840 may be implemented in a variety of known ways. Temperature sensor 1840 may be, for example, a thermistor in contact, for example, with pot insert 1920. Pot insert 1920 may include a thermoconductive coil 1841 plated to the inside of the pot. An exposed end 1842 of the coil 1841 may lead through the pot 1920 so that a thermal contact 1843 touches the exposed end 1842 when the pot is properly in place. Thermal contact 1843 may be affixed to a side of a heating well 1950 in which heater 1910 is disposed and pot insert 1920 is placed. Thermal contact 1843 may be connected to the temperature sensor 1840.

In addition, temperature sensor 1840 alternatively may include, for example, a metallic probe 1960 that may be removably coupled to an exterior connection 1961 on the slow cooker 1900 via a braided cable 1962. The metallic probe 1960 may be inserted through a hole 1941 formed in the lid 1940. Preferably the braided cable 1962 is connected to the metallic probe 1960 in a watertight fashion, and a tip 1963 of the probe may be placed into food cooking in the pot insert 1920. A base 1964 of the probe either may rest against the lid 1940 or the base 1964 may suspended by the cable 1962 into the pot insert 1920.

Similarly, the optional sensor 232 can be implemented in a variety of known ways (e.g., capacitive, conductive, etc.). The liquid sensor 232 may be omitted in the interest of affordability. The liquid sensor 232 would sense whether there is a predetermined quantity of liquid in the pot insert 1920. The sensor 232 preferably may be placed at a level in the pot insert 1920 which ensures that a desired minimum amount of liquid (e.g., two cups) would be present in the pot insert 1920 before a cooking cycle is initiated.

In an exemplary embodiment, the sensor 232 may comprise two electrical conductors that project into the pot insert 1920. The impedance between the conductors would vary depending on the presence of liquid at the conductors. A circuit 235 may sense the impedance across the two conductors and provide a binary signal to the microcontroller 205 in accordance with the sensed impedance. The binary signal thus would provide an indication of the absence or presence of liquid in the pot insert 1920.

In accordance with messages received via the PLC interface, the microcontroller 205 of the slow cooker 1900 may control the activation or deactivation of the heater 1910, thus controlling the start or finish of a cooking cycle. Via the PLC interface, the slow cooker 1900 may be commanded to immediately begin or end a cooking cycle or it may be commanded to begin or end a cooking cycle at a specified future time. The microcontroller 205 may transmit messages via the PLC interface 210 indicating the progress of a cooking cycle and, optionally, the presence of liquid in the pot insert 1920.

Before initiating a cooking cycle, the slow cooker 1900 optionally may take into account the status of the pot insert 1920. However, this functionality may increase the relative cost of the slow cooker 1900 and may be implemented, for example, only in higher end models. If the slow cooker 1900 were to receive a command via the PLC interface to begin a cooking cycle while the sensor 232 indicates that the pot insert 1920 does not contain a minimum amount of liquid (e.g., two cups), the microcontroller 205 could override the command and keep the heater 1910 off. The slow cooker 1900 optionally could also transmit a message to the system controller (e.g., console 50) indicating that the pot insert 1920 does not contain the minimum quantity of liquid and that the requested cooking cycle will not be initiated. The system controller, in turn, could indicate the low-liquid condition to the user, thereby prompting the user to fill the pot insert 1920. Once the pot insert 1920 were refilled, the cooking cycle request could be reinstated automatically or the user could be required to request the cooking cycle anew.

In yet a further exemplary embodiment, the slow cooker 1900 may comprise means for detecting the presence of food in the pot insert 1920 and for determining if the contents have already been cooked. Such means can include a sensor 535 for weighing the pot insert 1920 in combination with a temperature sensor 1840. As with the liquid sensor 232, weight sensor 535 may add to the relative cost of the slow cooker 1900. Therefore, in the interest of affordability, weight sensor 535 and its related functionality may be omitted in less expensive models. Nonetheless, weight sensor 535 could be implemented in a manner substantially similar to the optional implementation of weight sensor 535 in breadmaker 1800. Likewise, the functionality that may accompany the weight measurement capability of the breadmaker 1800 also may be included in slow cooker 1900 in the event that weight measurement were included in slow cooker 1900. By weighing the pot insert 1920, a determination could be made as to the presence of food in the pot insert 1920, and by measuring the temperature of the pot insert, a determination could be made as to whether it has been recently heated.

Additionally, the console may keep a log of the use of the slow cooker 1900, from which it can infer the state of the contents. The log may be used with or without the input from sensors 535 and 1840. However, in the event that sensors 535 and 1840 were included, the log could make a more intelligent estimation as to state of the slow cooker contents. For example, after having logged a cooking cycle, if the weight and temperature sensors were to indicate the removal of a warm, full pot insert 1920, replacement by a warm empty pot insert 1920, and then further replacement by a warm full pot insert 1920, the console may infer that the contents of the full pot insert 1920 have not yet been cooked despite their warm temperature, because the pot insert 1920 had been emptied since the last cooking cycle.

FIG. 18B shows an exemplary control panel 520 for a slow cooker 1900 of the present invention. The control panel 520 comprises a display 561, one or more indicators 562, a plurality of buttons 551 and a dial 553. As with other appliances in accordance with the present invention, the slow cooker 1900 can be controlled entirely from the control panel 520 in a standalone mode. Additionally, the slow cooker 1900 can be operated from the console 50, as in a control and communications system of the present invention, or via an IR interface 280. The IR interface 280 can be used, for example, to communicate with a PDA. The slow cooker 1900 can also operate in an automatic or manual mode from either the control panel 520 or from the console 50.

Typically, however, the slow cooker 1900 will be operated automatically from the console 50 and manually mode from the control panel 520. A control panel 520 comprising buttons 551 and a display 561 are used for this purpose and thus provide a standard set of functions such as a timer/clock, "ON/OFF", "set delayed cook time", etc. The display 561 may also be used to display status information (e.g. "COOK LATER", "ADD LIQUID"). The buttons 551 can also be used to override remote PLC control of the slow cooker 1900 or to re-program the slow cooker 1900 locally.

An additional indicator 562 (or the display 561) can be used to indicate the communications status of the slow cooker 1900 over the PLC interface. If there is a controller 50, 59, 60 present on the same wiring 27, the microcontroller 205 may turn on the indicator 562. During actual communication, the microcontroller 205 can cause the indicator 562 to flash. The microcontroller 205 may keep the indicator 562 off if there is no system controller 50, 59, 60 present or if there is an error condition. If there is an error condition, additional information can be provided by the display 561 or on the display of the system controller.

A schematic block diagram of an exemplary circuit for a slow cooker 1900 is shown in FIG. 19B. Like other PLC appliances of the present invention, the slow cooker 1900 comprises a microcontroller 205 coupled to a PLC interface 210. The microcontroller 205 may be coupled to and control the heater control circuitry 242, the display 561 and the indicators 562 on the control panel 520. Optionally, the microcontroller 205 may be coupled to and control a motor control and monitoring circuit 241 in the event that a stirring functionality is desired. The stirring functionality may be omitted in the interest of affordability. The microcontroller 205 also may be coupled to and receive input from the optional motor control and monitoring circuit 241, the buttons 551 and the dial 553 on the slow cooker control panel, as well as optional liquid sensor 232, optional weight sensors 535 and temperature sensor 1840. The position of the dial 553 can be detected using a variety of known techniques, such as optical encoding. An encoder 555 is coupled to the microcontroller 205 to provide an indication of the position of the dial 553.

As described above, the slow cooker 1900 optionally may comprise a motor 525 for driving one or more mixing blades 527, or the like, for mixing the contents of the pot insert 1920. The motor 525 could be implemented in a manner substantially similar to the implementation of motor 525 in breadmaker 1800, including the use of motor control and monitoring circuit 241 and sensing device 243.

The microcontroller 205 may control the slow cooker heater 1910 and optional motor 525 in accordance with inputs to the control panel 520, messages received by the slow cooker over the PLC and IR interfaces or a program being executed by the microcontroller. For example, via the control panel 520, a user may manually start or stop the slow cooker heater and motor, specify a duration of operation of both, and set the temperature of the heater and the speed of operation of the motor using, for example, the dial 553. Also via the control panel 520, console 50 or PDA, a user can access timer functions which allow the user to specify a start and stop time or a start time and a duration of operation of the heater and motor. The timer functions allow the user to set up the slow cooker 1900 to perform a lengthy cooking cycle, while freeing the user to perform other tasks without requiring the user's attention to the state of the slow cooker.

Messages from the console 50 received over the PLC or IR interface may command the slow cooker heater or optional motor to start immediately or at some future time or to stop immediately or at some future time, and also may specify a temperature or speed setting (if none specified, the dial setting or some default setting can be used). Even while the slow cooker is under the control of the console 50, the dial 553 can be used to fine-tune the temperature of the heater 1910 or the speed of the slow cooker motor 525, about the levels specified by the console 50. The user may override the remotely set power levels, stir timer, or cook timer by manually adjusting the level control or timer settings, even while the stir or cook cycle is progressing. However, the controller may be programmed to prevent the user from altering the appliance instructions set forth in a recipe while a meal is being prepared, so as to prevent the user from causing the meal to be incorrectly cooked.

The exemplary slow cooker 1900 of FIGS. 19A–19B may include a weight measurement capability. As stated above, weight sensor 535 and its related functionality may be omitted in less expensive models. Similar to the optional implementation of weight measurement in breadmaker 1800, implementation of weight measurement in slow cooker 1900 may include a plurality of weight sensors 535 arranged between the base 1930 of the slow cooker 1900 and each of four feet 1935, circuit 231, analog multiplexer 537, and 22-bit A/D converter 540. Moreover, the functionality of weight measurement in the breadmaker 1800, including, for example, the weighing of recipe ingredients, would be applicable in the slow cooker 1900 as well.

Rice Cooked/Steamer

Figure 20A:
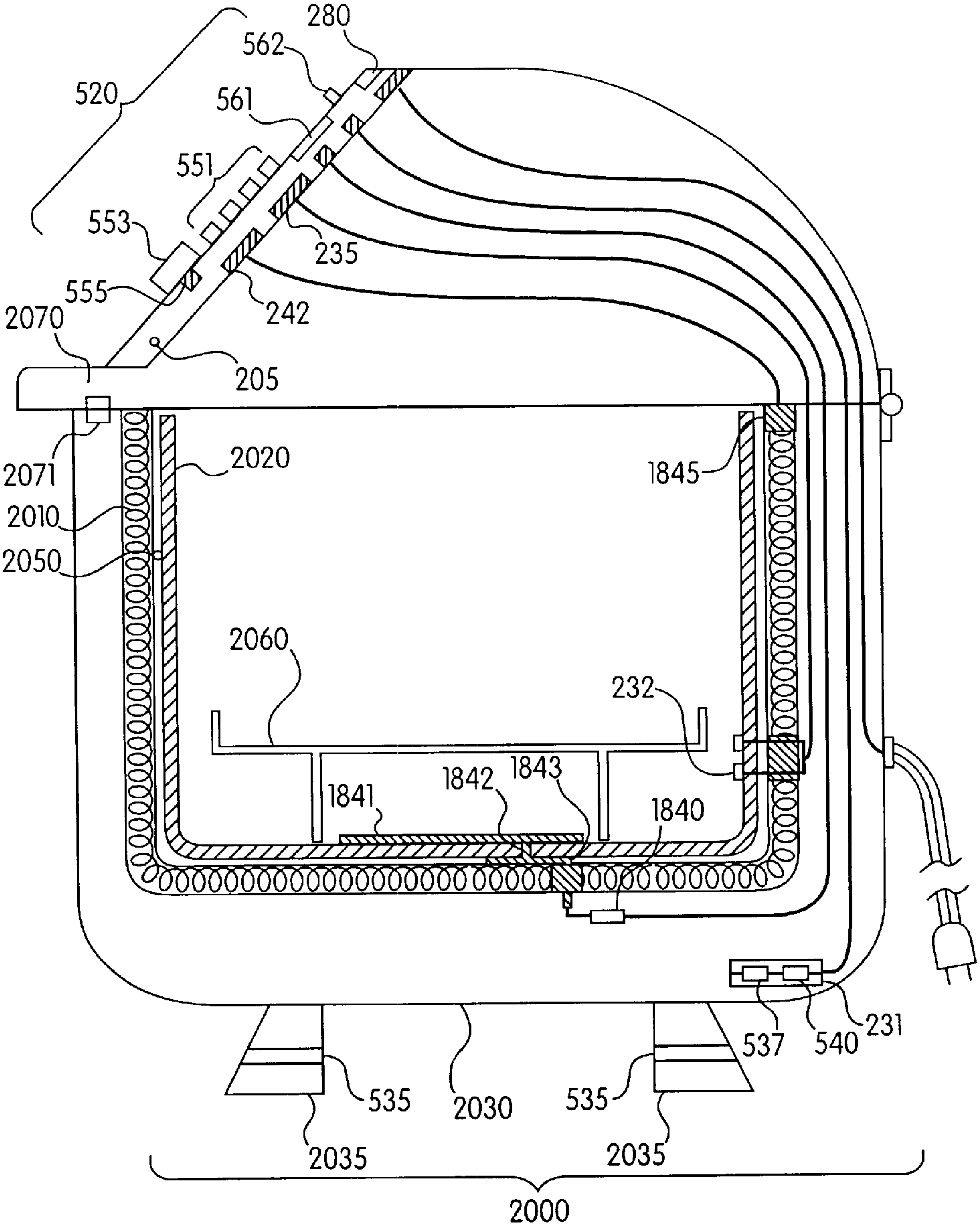
FIGS. 20A–20B show an exemplary embodiment of a rice cooker/steamer in accordance with the present invention.

FIG. 20A shows an exemplary embodiment of a rice cooker/steamer 2000 according to the present invention. Rice cooker/steamer 2000 comprises a PLC interface 210 coupled to a microcontroller 205. The microcontroller 205 receives inputs from a set of buttons or switches 551, and controls a display 561.

Depending on the food to be prepared, rice cooker/steamer 2000 may cook rice as a conventional rice cooker or steam food as a steamer. As with conventional rice cookers, the rice cooker 2000 may comprise a heater 2010, a pot insert 2020, and a sealable lid 2070. Steamer 2000 also may include strainer 2060 that rests within pot insert 2020 or replaces pot insert 2020. Preferably, the pot insert 2020 may be removable for easier cleaning, but pot insert 2020 need not be removable. The heater 2010 may be powered by heater control circuitry 242, which may be controlled by the microcontroller 205. Heater control circuitry 242 may include a thermostat 1845 to monitor and regulate the temperature of the pot insert 2020. The pot insert 2020 may be provided with an optional water sensor 232 and a temperature sensor 1840.

Temperature sensor 1840 may be implemented in a variety of known ways. Temperature sensor 1840 may be, for example, a thermistor in contact, for example, with pot insert 2020. Pot insert 2020 may include a thermoconductive coil 1841 plated to the inside of the pot. An exposed end 1842 of the coil 1841 may lead through the pot 2020 so that a thermal contact 1843 touches the exposed end 1842 when the pot is properly in place. Thermal contact 1843 may be affixed to a side of a heating well 2050 in which heater 2010 is disposed and pot insert 2020 is placed. Thermal contact 1843 may be connected to the temperature sensor 1840.

Similarly, the optional water sensor 232 may be implemented in a variety of known ways (e.g., capacitive, conductive, etc.). The addition of the water sensor 232 may add to the relative cost of rice cooker 2000 and therefore may be omitted in the interest of affordability. The water sensor 232 may sense whether there is a predetermined quantity of water in the pot insert 2020. The sensor 232 preferably would be placed at a level in the pot insert 2020 which ensures that a desired minimum amount of water (e.g., two cups) is present in the pot insert 2020 before a cooking cycle is initiated.

In an optional, exemplary embodiment, the sensor 232 may comprise two electrical conductors that project into the pot insert 2020. The impedance between the conductors would vary depending on the presence of water at the conductors. A circuit 235 may sense the impedance across the two conductors and provides a binary signal to the microcontroller 205 in accordance with the sensed impedance. The binary signal thus would provide an indication of the absence or presence of water in the pot insert 2020.

In accordance with messages received via the PLC interface, the microcontroller 205 of the rice cooker can control the activation or deactivation of the heater 2010, thus controlling the start or finish of a cooking cycle. Via the PLC interface, the rice cooker 2000 can be commanded to immediately begin or end a cooking cycle or it may be commanded to begin or end a cooking cycle at a specified future time. The microcontroller 205 can transmit messages via the PLC interface 210 indicating the progress of a cooking cycle and, optionally, the presence of water in the pot insert 2020.

Before initiating a cooking cycle, the rice cooker 2000 optionally may take into account the status of the pot insert 2020 and the lid 2070. Lid 2070 may have a lid sensor 2071 coupled to microcontroller 205 that detects whether the lid is sealed. However, this functionality may increase the relative cost of the rice cooker 2000 and may be implemented only in higher end models. If the rice cooker 2000 were to receive a command via the PLC interface to begin a cooking cycle while either sensor 2071 indicates that the lid is not sealed or sensor 232 indicates that the pot insert does not contain a minimum amount of water (e.g., two cups), then the microcontroller 205 could override the command and keep the heater 2010 off. The rice cooker 2000 also may transmit a message to the system controller (e.g., console 50) indicating that the lid is not sealed and/or that the pot insert 2020 does not contain the minimum quantity of water and that the requested cooking cycle will not be initiated. The system controller, in turn, may indicate the open-lid and low-water conditions to the user, thereby prompting the user to fill the pot insert and/or seal the lid. Once the pot insert were refilled and the lid were sealed, the cooking cycle request could be reinstated automatically or the user could be required to request the cooking cycle anew.

In yet a further exemplary embodiment, the rice cooker 2000 optionally may comprise means for determining if the contents of pot insert 2020 have already been cooked. Such means can include an optional sensor 535 for weighing the pot insert 2020 in combination with an optional water sensor 232 and a temperature sensor 1840. As with the water sensor 232 and lid sensor 2071, weight sensor 535 may add to the relative cost of the rice cooker 2000. Therefore, in the interest of affordability, weight sensor 535 and its related functionality may be omitted in less expensive models. Nonetheless, weight sensor 535 could be implemented in a manner substantially similar to the optional implementation of weight sensor 535 in breadmaker 1800. Likewise, the functionality that may accompany the weight measurement capability of the breadmaker 1800 also may be included in rice cooker 2000 in the event that weight measurement were included in rice cooker 2000.

When operating as a rice cooker, the initial contents of the pot insert may include water and rice at a lower temperature. After a cooking cycle, the water has boiled off or been absorbed by the rice, and the rice is hot and moist. The cooked rice is heavier than it was before cooking, but not as heavy as the uncooked rice plus the initial water. By thus weighing the pot insert 2020, a determination could be made as to the weight of the contents. If the contents are hot and heavier than uncooked rice and there is absence of water in the pot insert 2020, then the rice cooker may determine that the pot insert contains cooked rice that has been recently heated. A steamer may make a similar determination for its contents.

Also, the console may keep a log of the use of the rice cooker 2000, from which it can determine the state of the contents. The log may be used with or without the input from sensors 535 and 1840. However, in the event that sensors 535 and 1840 were included, the log could make a more intelligent estimation as to state of the slow cooker contents.

For example, after having logged a cooking cycle, if the weight and temperature sensors were to indicate the removal of a warm, full pot insert 2020 without water, replacement by a warm, empty pot insert 2020, and then further replacement by a warm, full pot insert 2020 with water, the console may determine that the contents of the full pot insert 2020 have not yet been cooked despite their warm temperature, because the pot insert 2020 had been emptied and refilled since the last cooking cycle.

FIG. 18B shows an exemplary control panel 520 for a rice cooker 2000 of the present invention. The control panel 520 comprises a display 561, one or more indicators 562, a plurality of buttons 551 and a dial 553. As with other appliances in accordance with the present invention, the rice cooker 2000 can be controlled entirely from the control panel 520 in a stand-alone mode. Additionally, the rice cooker 2000 can be operated from the console 50, as in a control and communications system of the present invention, or via an IR interface 280. The IR interface 280 can be used, for example, to communicate with a PDA. The rice cooker 2000 can also operate in an automatic or manual mode from either the control panel 520 or from the console 50.

Typically, however, the rice cooker 2000 will be operated automatically from the console 50 and manually mode from the control panel 520. A control panel 520 comprising buttons 551 and a display 561 are used for this purpose and thus provide a standard set of functions such as a timer/clock, "ON/OFF", "set delayed cook time", etc. The display 561 may also be used to display status information (e.g. "COOK LATER", "ADD WATER"). The buttons 551 can also be used to override remote PLC control of the rice cooker 2000 or to re-program the rice cooker 2000 locally.

An additional indicator 562 (or the display 561) can be used to indicate the communications status of the rice cooker 2000 over the PLC interface. If there is a controller 50, 59, 60 present on the same wiring 27, the microcontroller 205 will turn on the indicator 562. During actual communication, the microcontroller 205 can cause the indicator 562 to flash. The microcontroller 205 will keep the indicator 562 off if there is no system controller 50, 59, 60 present or if there is an error condition. If there is an error condition, additional information can be provided by the display 561 or on the display of the system controller.

Figure 20B:
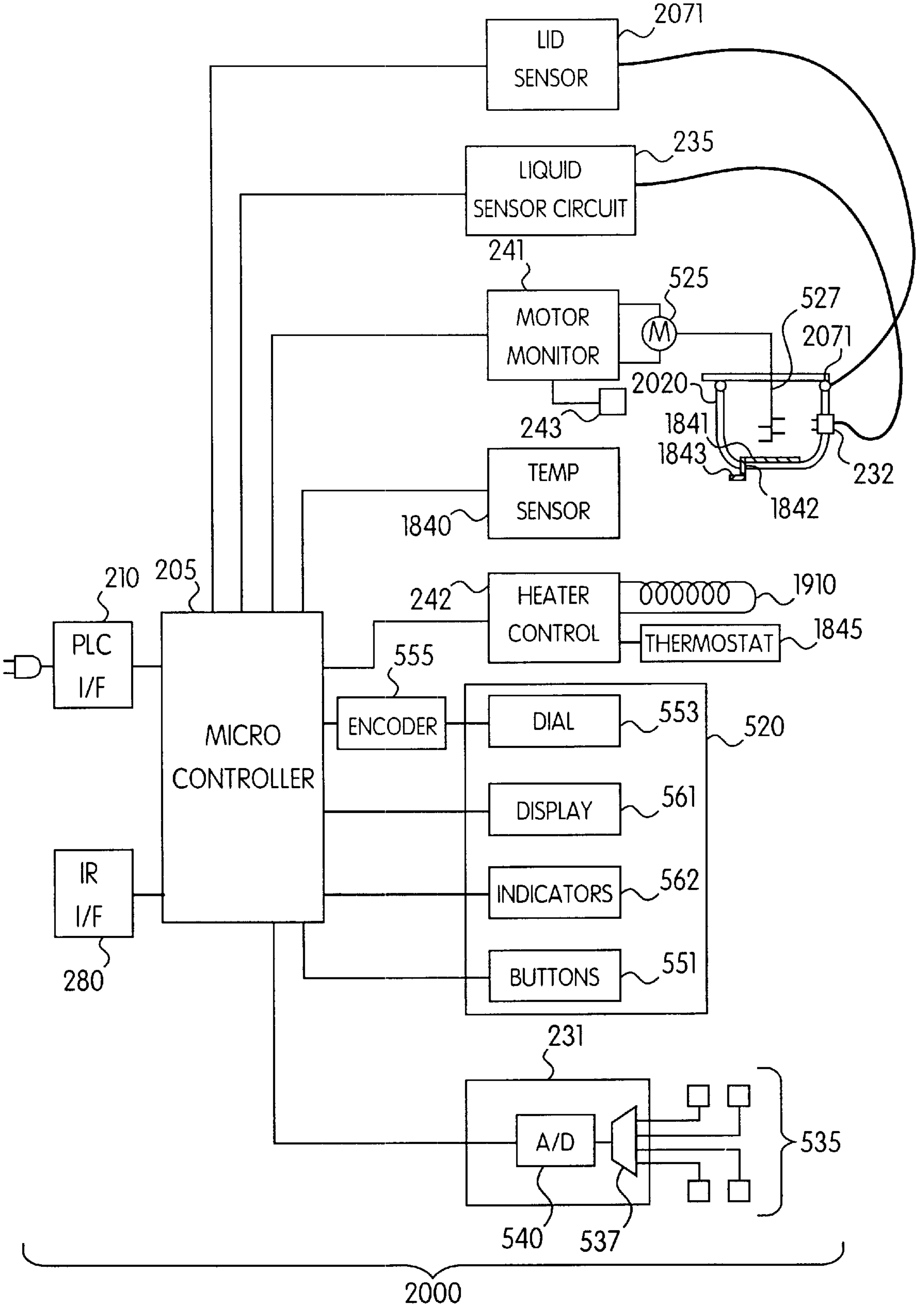

A schematic block diagram of an exemplary circuit for a rice cooker 2000 is shown in FIG. 20B. Like other PLC appliances of the present invention, the rice cooker 2000 comprises a microcontroller 205 coupled to a PLC interface 210. The microcontroller 205 may be coupled to and control the heater control circuitry 242, the display 561 and the indicators 562 on the control panel 520. Optionally, the microcontroller 205 may be coupled to and control a motor control and monitoring circuit 241 in the event that an optional stirring functionality is included. The microcontroller 205 also may be coupled to and receive input from the optional motor control and monitoring circuit 241, the buttons 551 and the dial 553 on the rice cooker control panel, as well as optional water sensor 232, optional lid sensor 2071, optional weight sensors 535 and temperature sensor 1840. The position of the dial 553 can be detected using a variety of known techniques, such as optical encoding. An encoder 555 is coupled to the microcontroller 205 to provide an indication of the position of the dial 553.

The rice cooker 2000 may comprise an optional motor 525 for driving one or more mixing blades 527, or the like, for mixing the contents of the pot insert 2020. In the event that the added expense is justifiable, the motor 525 could be implemented in a manner substantially similar to the implementation of motor 525 in breadmaker 1800, including the use of motor control and monitoring circuit 241 and sensing device 243.

The microcontroller 205 may control the rice cooker heater 2010 and optional motor 525 in accordance with inputs to the control panel 520, messages received by the rice cooker over the PLC and IR interfaces or a program being executed by the microcontroller. For example, via the control panel 520, a user may manually start or stop the rice cooker heater and motor, specify a duration of operation of both, and set the temperature of the heater and the speed of operation of the motor using, for example, the dial 553. Also via the control panel 520, console 50 or PDA, a user may access timer functions which allow the user to specify a start and stop time or a start time and a duration of operation of the heater and motor. The timer functions allow the user to set up the rice cooker 2000 to perform a lengthy cooking cycle, while freeing the user to perform other tasks without requiring the user's attention to the state of the rice cooker.

Messages from the console 50 received over the PLC or IR interface may command the rice cooker heater or optional motor to start immediately or at some future time or to stop immediately or at some future time, and also may specify a temperature or speed setting (if none specified, the dial setting or some default setting can be used). Even while the rice cooker is under the control of the console 50, the dial 553 can be used to fine-tune the temperature of the heater 2010 or the speed of the rice cooker motor 525, about the levels specified by the console 50. The user may override the remotely set power levels, stir timer, or cook timer by manually adjusting the level control or timer settings, even while the stir or cook cycle is progressing. However, the controller may be programmed to prevent the user from altering the appliance instructions set forth in a recipe while a meal is being prepared, so as to prevent the user from causing the meal to be incorrectly cooked.

The exemplary rice cooker 2000 of FIGS. 20A–20B may include a weight measurement capability. As stated above, weight sensor 535 and its related functionality may be omitted in less expensive models. Similar to the optional implementation of weight measurement in breadmaker 1800, implementation of weight measurement in rice cooker 2000 may include a plurality of weight sensors 535 arranged between a base 2030 of the slow cooker 2000 and each of four feet 2035, circuit 231, analog multiplexer 537, and 22-bit A/D converter 540. Moreover, the functionality of weight measurement in the breadmaker 1800, including, for example, the weighing of recipe ingredients, would be applicable in the rice cooker 2000 as well.

Wireless Appliances and Devices

PLC/Wireless Bridge

Figure 12:
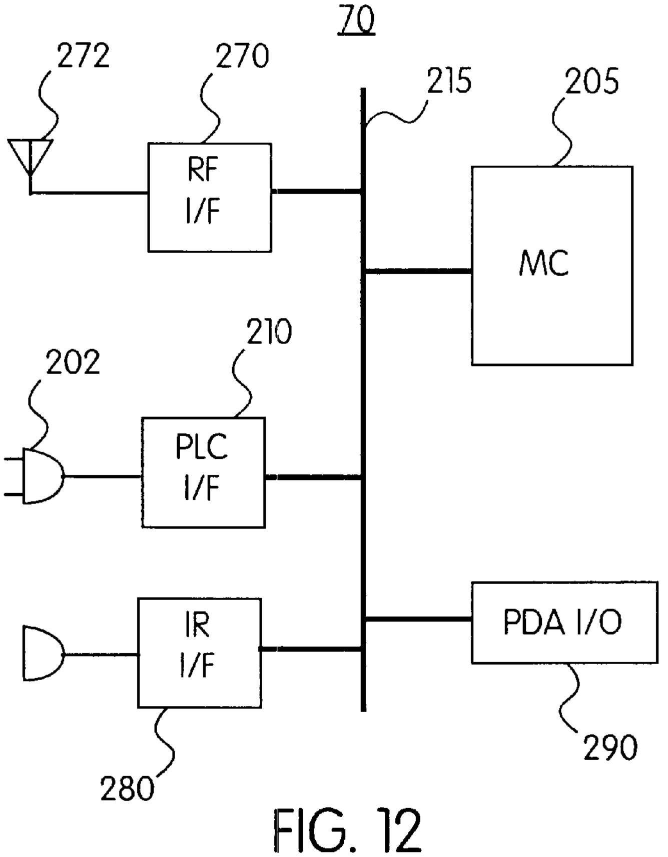
FIG. 12 shows a block diagram of an exemplary embodiment of a PLC/wireless bridge device in accordance with the present invention.

FIG. 12 shows the block diagram of an exemplary embodiment of a PLC/wireless bridge device 70. As described above, the PLC/wireless bridge 70 allows wireless devices such as the scale 72, the smoke detector 74 and the blood pressure monitor 76 to communicate with PLC devices, such as the system controllers 50, 59, 60. The exemplary PLC/wireless bridge 70 of FIG. 12 comprises an RF interface 270 and a PLC interface 210, each coupled to a microcontroller 205. The RF interface 270 can be implemented using a frequency-hopping spread-spectrum IC available from Zilog Corporation, although other implementations are possible.

The bridge device 70 may also include an IR interface 280 for communicating with other devices having IR interfaces. The wireless bridge 70 can also be integrated into the console 50 or clock 60. The wireless bridge 70 can also communicate with other devices such as PDAs over the RF or IR interfaces or via a PDA I/O port 290. A PDA loaded with the appropriate software in combination with the wireless bridge 70 can act as a system controller. Moreover, a PDA having a modem can provide an external connection to the Internet or the like.

Additionally, the wireless bridge 70 is also capable of setting up and maintaining the wireless links between it and the wireless devices of the present invention. Upon powering up, the wireless bridge 70 listens for traffic on all of the channels provided by the aforementioned spread-spectrum technique and selects a channel that is not in use or which has the least noise. The bridge 70 will then use the selected channel to communicate with the RF devices of the present invention. Before an RF device of the present invention is first placed in service, it is programmed to communicate on the selected channel. As described more fully below, this programming can occur via the RF interface, an IR interface or via buttons on the RF device. If the bridge 70 detects that the selected channel has become unacceptable (e.g., due to noise), it will rescan and select a new channel. The other RF devices must then be informed of the new channel, as upon initial setup.

Smoke Detector

Figure 13:
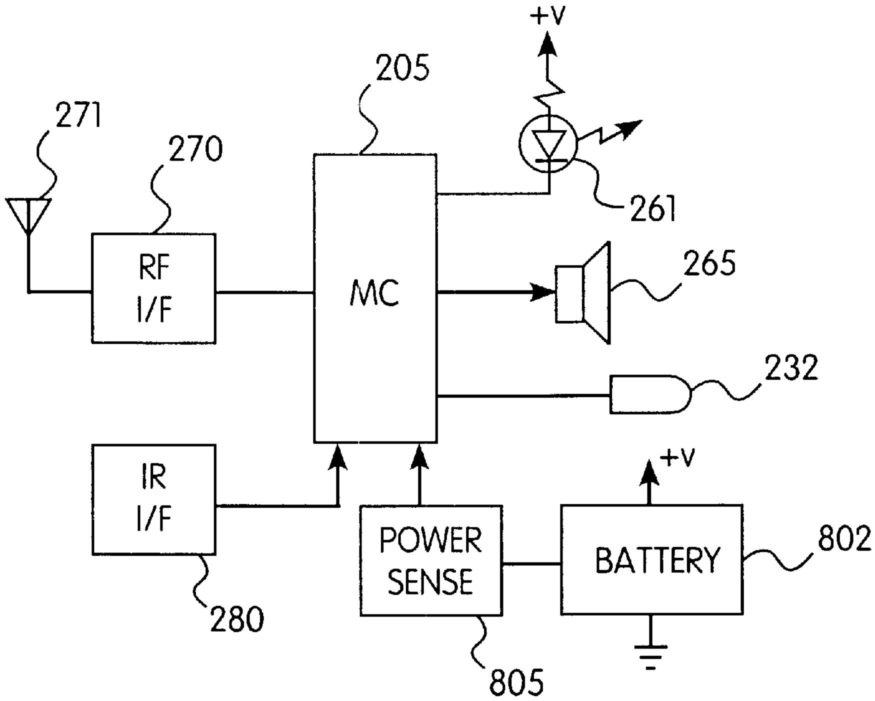
FIG. 13 shows a block diagram of an exemplary embodiment of a smoke detector device in accordance with the present invention.

FIG. 13 shows a block diagram of an exemplary embodiment of a smoke detector 74 in accordance with the present invention. As mentioned, the smoke detector 74 is a wireless device that preferably communicates via an RF link with the PLC/wireless bridge 70. As shown in FIG. 13, the smoke detector comprises a smoke sensor 232, a sound generating element 265, a status indicator 261 and an RF interface 270. The various elements of the smoke detector are coupled to and controlled by a microcontroller 205.

The smoke detector of FIG. 13 is powered by one or more batteries 802, thereby allowing it to be placed anywhere without requiring the routing of power lines thereto. The smoke detector includes a power sensing circuit 805 which monitors the condition of the battery 802 such as by sensing the voltage developed by the battery. The power sensing circuit 805 is coupled to the microcontroller 205 and provides the microcontroller with an indication of the battery's condition. The power sensing circuit 805 may be implemented and operate in a variety of well-known ways. For example, the sensing circuit 805 may include an analog-to-digital converter and provide to the microcontroller a digital representation of the battery's voltage level, or the sensing circuit may include a comparator which provides a binary indication to the microcontroller whether the voltage of the battery 802 is above or below a predetermined threshold.

In the exemplary embodiment of FIG. 13, the RF interface 270 includes a transmitter that allows the smoke detector to transmit signals to the PLC/wireless bridge 70. Via the RF link, the smoke detector 74 can transmit to the bridge device 70 messages indicating alarm status (i.e., the presence of a smoke condition) and battery status (e.g., an indication that the battery needs to be replaced and/or the actual voltage level developed by the battery), in addition to any other messages used by the system for administrative purposes. To save power, the RF transmitter of the RF interface 270 is on preferably only when transmitting a message. The duration of each message is on the order of 10 ms.

In addition to transmitting alarm and battery status messages, the smoke detector 74 will also preferably generate an audible smoke alarm and battery status tone from its sound generating device 265. The indicator 261 can also indicate the battery condition. As such, the smoke detector 74 can be used in a stand-alone mode, similarly to a conventional smoke detector.

When the system controller receives an alarm or battery-low message from a smoke detector 74, in addition to indicating the event at the controller (e.g., via display or sound), the controller can also generate a voice mail or e-mail message and transmit that to a monitoring service, fire department, homeowner, etc. via the external communications interface. When the controller 50, 59, 60 receives a low-battery message from the smoke detector 74 (or any battery-powered wireless device with that capability) it can automatically generate or add to a pending shopping list the correct number and type of batteries to replace the failing batteries.

In addition to transmitting data via its RF interface 270, the smoke detector may also be capable of receiving data, for purposes such as initial programming of the smoke detector. When initially programming the smoke detector 74, or any other wireless device in accordance with the present invention, the smoke detector 74 is provided with the house code of the system in which it is to operate and the RF channel on which it is to communicate with the wireless bridge 70. Additionally, it may be desirable to program each smoke detector 74 with an identifying code or name that identifies the individual smoke detector. Preferably, the identifier is descriptive to the user conveying the location of the smoke detector (e.g., "KITCHEN"). This identifier can be included in the alarm status or battery status messages transmitted by the smoke detector 74 to the PLC/wireless bridge 70. These messages are then provided to the controller 50, 59, 60 that informs the user of the specific smoke detector which has generated an alarm or battery condition message. The programmed identifier can also be audibly generated by the smoke detector's sound generating device 265 during an alarm or low-battery condition.

As an alternative to storing the user-selected identifier (e.g., location) of a smoke detector in the smoke detector, each system controller can maintain a list that associates the serial number of each smoke alarm with its user-selected identifier. This approach reduces the memory requirements of the smoke alarm so that it need only store the RF channel and housecode in its non-volatile memory to complete its installation in a home.

Loading data such as the aforementioned programming information into the smoke detector 74 can be accomplished in a variety of ways. In one embodiment, the RF interface 270 may include a receiver so as to provide bi-directional RF connectivity, thereby allowing the smoke detector to transmit and to receive signals to and from the PLC/wireless bridge 70. In this case, when a smoke detector 74 is powered-up in a system of the present invention, it will scan the RF channels until it finds the channel that the wireless bridge device 70 of the system is using to communicate to the wireless devices. The indicator 261 can indicate establishment of the RF link.

Upon establishment of an RF link between the wireless bridge 70 and the new smoke detector 74, the wireless bridge 70 can provide the new smoke detector 74 with the house code and inform the system controller of the presence of a new smoke detector 74, as described above. The system controller can then prompt the user to provide an identifier (e.g., "KITCHEN", "#4") for the smoke detector 74. When the user enters the identifier at the controller, the identifier is provided to the new smoke detector 74, which stores it in its non-volatile memory. Additionally or alternatively, as above, the system controller can store the identifier in association with the smoke detector's serial number in the controller's memory.

In an alternative embodiment, where the RF interface 270 provides only transmitting capability, an IR interface 280 can be used to receive the programming data. Using the IR interface 280 of the console 50, the alarm clock 60 or the wireless bridge 70, the RF channel information, house code and smoke detector identifier can be transmitted from the system controller 50, 59, 60 to the smoke detector's IR interface 280 and stored in the smoke detector's non-volatile memory. In this case, the smoke detector would be held in front of the transmitting IR device, such as the wireless/PLC bridge 70, during the programming procedure. The smoke detector would then be mounted in its intended location.

In yet a further alternative embodiment (not shown), the smoke detector 74 can be provided with one or more switches or buttons for entering the programming data.

The disclosure herein regarding the smoke detector 74 is also readily applicable to other kinds of detectors, such as carbon monoxide detectors and the like. Moreover, the start-up and programming procedures described in connection with the smoke detector 74 are also applicable to other wireless devices of the present invention. Furthermore, while the smoke detector 74 is described above as a battery-powered wireless device, as is well understood in light of the present disclosure, the smoke detector of the present invention can also be implemented with a PLC interface and be powered from household wiring.

Blood Pressure Monitor

Figure 14:
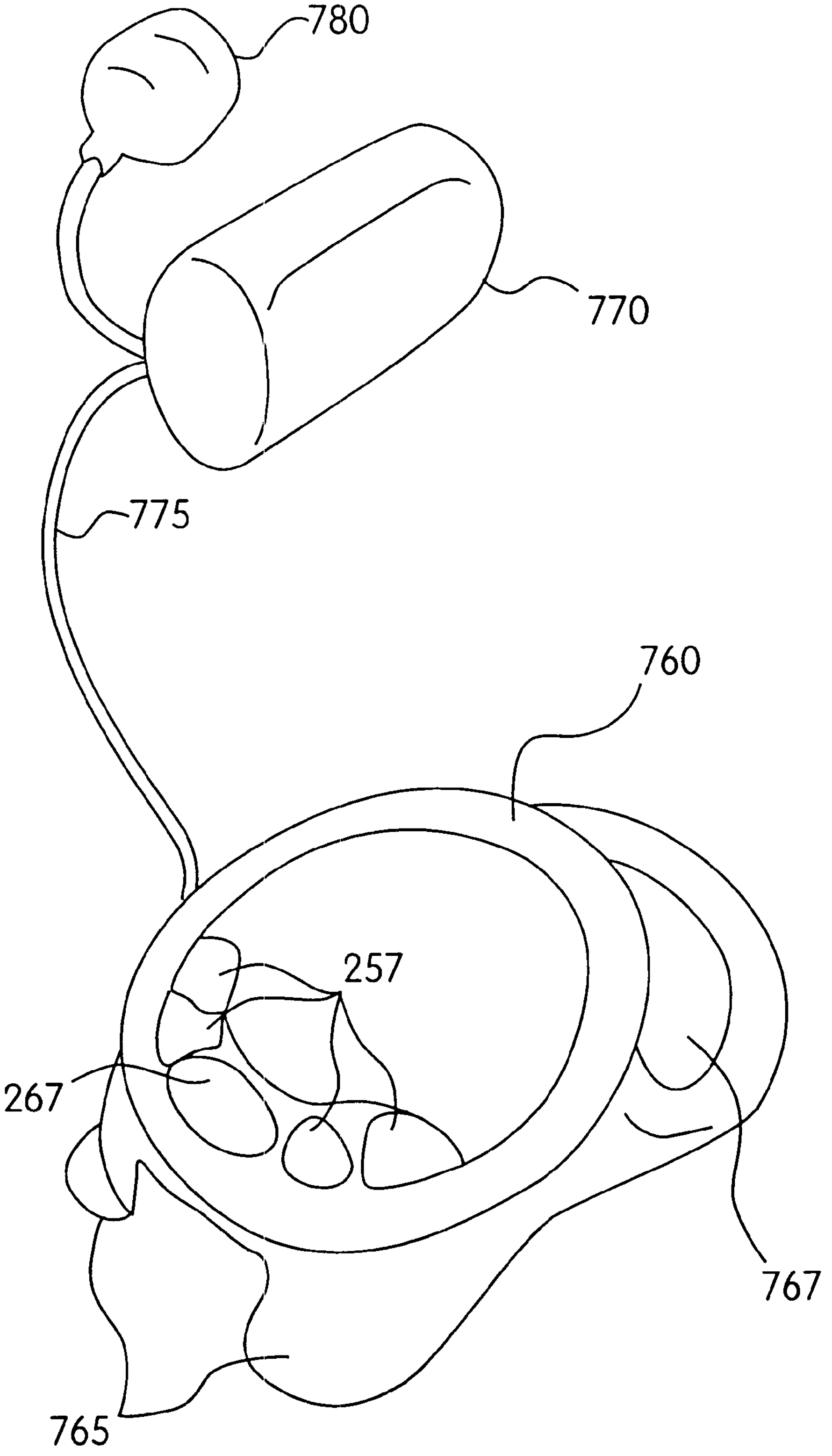
FIG. 14 shows an exemplary embodiment of a blood pressure monitoring device in accordance with the present invention.

FIG. 14 shows an exemplary embodiment of a blood pressure (BP) monitor 76 in accordance with the present invention. The exemplary BP monitor 76 of FIG. 14 comprises a display and control unit 760, which houses the circuitry for the BP monitor, and an arm cuff 770 coupled to the display and control unit 760 via an air hose 775. A manual pump 780 may be included for inflating the cuff 770. Alternatively, the display/control unit 760 may include an electrically operated pump to inflate the cuff 770.

The control unit 760 is adapted to rest on the user's thigh and comprises positioning features 765 and a cuff holder 767 for storing the cuff 770 when not in use.

Figure 15:
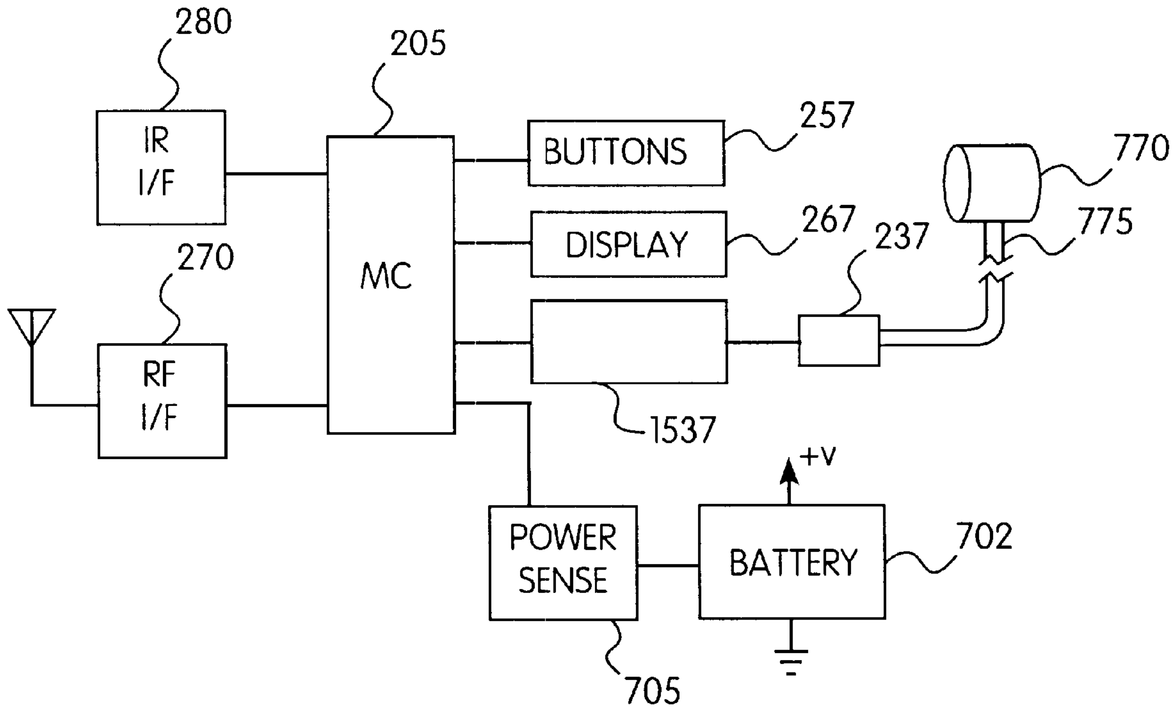
FIG. 15 shows a block diagram of an exemplary embodiment of a blood pressure monitoring device in accordance with the present invention.

FIG. 15 shows a block diagram of an exemplary embodiment of a circuit for a BP monitor 76 of the present invention. As mentioned, the blood pressure monitor 76 is an RF device that communicates via an RF link with the bridge device 70. As shown in FIG. 15, the BP monitor comprises a pressure sensor 237 which is coupled to the hose 775 and senses the pressure in the cuff 770, a display 267, buttons 257, a power sensing circuit 705 and an RF interface 270. In addition to measuring blood pressure, the BP monitor 76 of the present invention can also measure pulse rate. The pressure sensor 237 is coupled to a processing circuit 1537 which generates a digital representation of the pressure sensed by the sensor 237, which representation is provided to the microcontroller 205. The blood pressure and pulse sensing means of the BP monitor 76 of the present invention can be implemented in known ways. The various elements of the blood pressure monitor are coupled to and controlled by a microcontroller 205.

One or more batteries 702 power the BP monitor of FIG. 15, thereby allowing it to be conveniently operated without the restrictions of a power cord. A power sensing circuit 705 monitors the condition of the battery power source 702 such as by sensing the voltage developed thereby. The power sensing circuit 705 is coupled to the microcontroller 205 to provide the microcontroller with an indication of the battery's condition. The power sensing circuit 705 maybe implemented and operate in a variety of well-known ways, as discussed above in connection with the smoke detector.

In the exemplary embodiment of FIG. 15, the RF interface 270 includes a transmitter that allows the blood pressure monitor to transmit signals to the PLC/wireless bridge 70. Via the RF link, the blood pressure monitor 76 can transmit to the bridge device 70 messages including one or more blood pressure and/or pulse measurements and battery status (e.g., an indication that the battery needs to be replaced). In addition to transmitting blood pressure and pulse measurements and battery status messages, the BP monitor 76 will also preferably display the measurements and battery status on the display 267. As such, the BP monitor 76 can be used in a stand-alone mode, similarly to a conventional blood pressure monitor. The monitor 76 can also store a plurality of measurements and display those on demand.

For initial programming of the BP monitor 76, the buttons 257 can be used to enter the requisite data house code, RF channel). As described above for the smoke detector 74, the blood pressure monitor 76 can be provided with an IR interface 280 or a bidirectional RF interface for loading programming information into the blood pressure monitor 76.

In addition to performing the initial programming, the buttons 257 can be used to enter the identity of a user from whom a measurement or series of measurements have been taken. The user identifiers can be included in measurement messages transmitted by the BP monitor 76 to the RF bridge 70. Preferably, the measurement messages also include the time and date that the corresponding measurement was made. The user identification and time/date data can also be stored by the BP monitor 76 and/or displayed on the display 267 along with the corresponding measurements.

Blood pressure and pulse measurement and battery status messages from the blood pressure monitor 76 are received by the PLC/wireless bridge 70 and forwarded via the PLC interface to the system controller 50, 59, 60. If a message indicating a low-battery condition is received, the controller 50, 59, 60 can generate an appropriate indication (e.g., a flashing icon and/or sound) to the user. Furthermore, the controller 50, 59, 60 can display and/or log the pressure/pulse measurements received from the monitor 76, along with the user identification and time/date information. That information can then be accessed remotely or transmitted, such as over the Internet, to a health care provider or the like. In response, the controller 50, 59, 60 may receive and display suggestions for altering one's diet in accordance with the reported blood pressure and pulse measurements.

In yet a further embodiment, the BP monitor may comprise an IR interface 280. Data from the BP monitor can be uploaded to a PDA or to the system via an IR receiver on the system controller (e.g., the console 50 or alarm clock 60) or on the PLC/wireless bridge device 70.

Foot Scale

Figure 16:
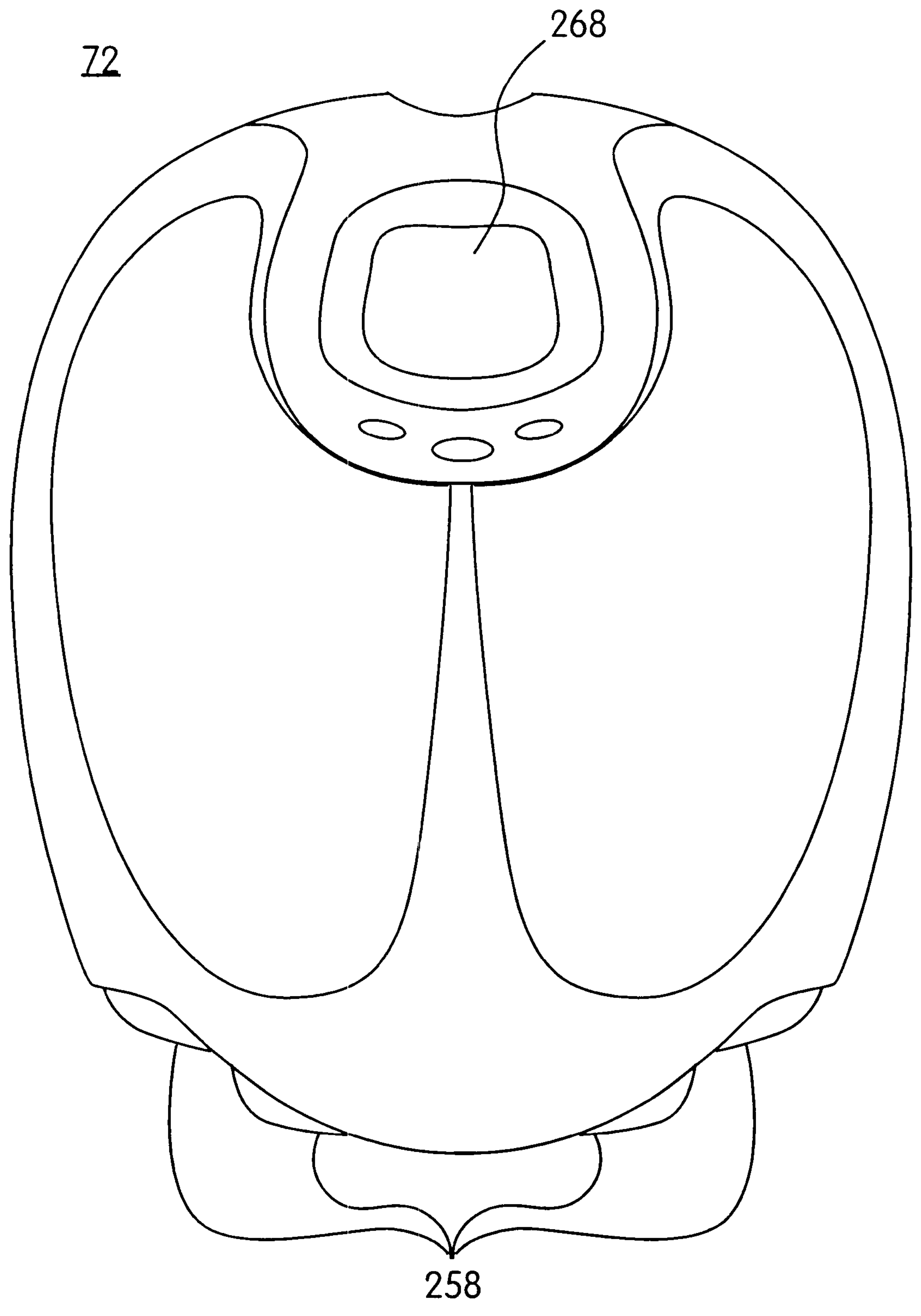
FIG. 16 shows an exemplary embodiment of a weight measurement device in accordance with the present invention.

FIG. 16 shows an exemplary embodiment of a foot scale 72 in accordance with the present invention. The exemplary scale 72 of FIG. 16 comprises a display 268 and a set of buttons 258.

Figure 17:
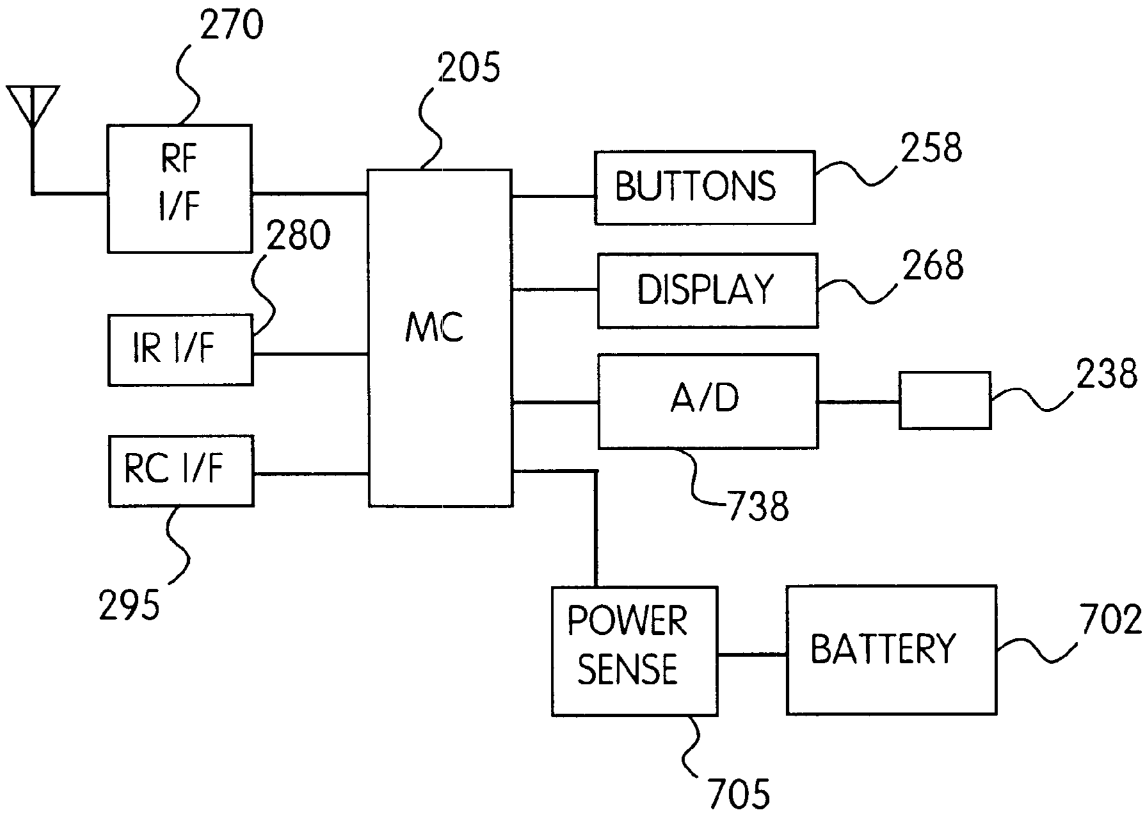
FIG. 17 shows a block diagram of an exemplary embodiment of a weight measurement device in accordance with the present invention.

FIG. 17 shows a block diagram of an exemplary embodiment of a circuit for a foot scale 72 of the present invention. As mentioned, the foot scale 72 is an RF device that communicates with the system of the present invention via an RF link provided by the PLC/wireless bridge 70. As shown in FIG. 17, the foot scale 72 comprises a weight sensor 238, a display 268, buttons 258, a power sensing circuit 705, an RF interface 270 and a microcontroller 205. The weight sensor 238 is coupled to an analog-to-digital converter 738 that is coupled to the microcontroller 205. The weight sensor 238 can be implemented, in a known way, using one or more load cells. In an exemplary embodiment, the weight sensor 238 comprises a load cell which includes a strain gauge in a bridge arrangement that generates a differential voltage which is amplified, filtered, and converted to digital form by the A/D converter 738.

The foot scale 72 may also comprise an IR interface 280 coupled to the microcontroller 205.

The foot scale of FIG. 17 is powered by one or more batteries 702, thereby allowing it to be conveniently placed and moved without the restrictions of a power cord. The power sensing circuit 705 monitors the condition of the battery power source 702 such as by sensing the voltage developed thereby. The power sensing circuit 705 is coupled to the microcontroller 205 to provide the microcontroller with an indication of the battery's condition. The power sensing circuit 705 may be implemented and operate in a variety of well-known ways, as described above in connection with the smoke detector.

In the exemplary embodiment of FIG. 17, the RF interface 270 includes a transmitter that allows the foot scale 72 to transmit signals to the PLC/wireless bridge 70. Via the RF link, the foot scale 72 can transmit to the PLC/wireless bridge 70 messages including one or more weight measurements and a battery status indication (e.g., an indication that the battery needs to be replaced). In addition to transmitting weight measurements and battery status messages, the foot scale 72 also displays weight measurements and battery status on the display 267. As such, the foot scale 72 can be used in a stand-alone mode, similarly to a conventional foot scale. The scale 72 can also store a plurality of measurements and display those on demand.

For initial programming of the foot scale, the buttons 258 can be used to enter the requisite data (e.g., house code, RF channel). As described above for the smoke detector 74, the foot scale 72 can be provided with an IR interface 280 or a bi-directional RF interface for loading programming information into the foot scale 72. The scale 72 may also be provided with a further interface 295, such as a parallel interface or an RS-232 serial data interface, for communicating directly with a PC for programming or measurement uploading purposes.

In addition to performing the initial programming, the buttons 258 can be used to identify a user from whom a measurement or series of weight measurements have been taken.

In the exemplary embodiment shown in FIG. 16, one button 258 is assigned to each of four users. Before a user steps on the scale 72, he can push his assigned button, thereby identifying himself to the scale (e.g., user #2). The user then steps on the scale and is weighed. The scale then displays the user's weight on the display 268 and stores the user's weight in non-volatile memory under the user's identity. The scale can then transmit (via the wireless bridge 70) a weight measurement message to the controller 50, 59, 60 with the user's identity and weight. Upon initial programming of the scale 72 or at the controller 50, 59, 60, a name can be assigned to each button 258 so that each user can be identified by name, as opposed to a button number.

Preferably, the weight measurement messages generated by the scale 72 also include the time and date of each measurement. The user identification, time/date and weight data for a plurality of measurements (e.g., 30) can also be stored by the foot scale 72 for each of the plurality of users and uploaded to the controller 50, 59, 60 periodically (e.g., daily) or on command from the controller. The stored information can also preferably be retrieved and displayed locally on the display 268. Access to the weight information of each user can also be restricted by password.

Weight measurement and battery status messages from the foot scale 72 are received by the PLC/wireless bridge 70 and forwarded via the PLC interface to the system controller 50, 59, 60. If a message indicating a low-battery condition is received, the controller 50, 59, 60 can generate an appropriate indication (e.g., a flashing icon and/or sound) to the user. Furthermore, the controller 50, 59, 60 can display, log, graph, etc. the weight measurements received from the foot scale 72, along with the user identification and time/date information. That information can then be accessed remotely or transmitted, such as over the Internet, to a health care provider or the like. The controller can also use the weight information to obtain diet suggestions from the Internet or to make suggestions of food items to add or substitute in a shopping list.

In an alternative embodiment, the scale can identify users by their weights. In this embodiment, the microcontroller 205 employs artificial intelligence to categorize users by their weights, e.g., the user whose weight is approximately 115 lbs. is user #1 whereas the user whose weight is approximately 175 lbs. is user #2. As each user's weight fluctuates, the scale updates the weight range associated with each user. If the weight reading is close to the recent readings for two or more users then the scale may pick the most likely match and ask the user if it is correct, or provide them with the most likely choices.

In yet a further embodiment, users can be identified by the scale 72 by the use of voice recognition. With this embodiment, upon stepping on the scale 72, the user is prompted to speak his name. The scale 72 stores the user's name and associated voice print the first time the user uses the scale. When the user uses the scale again, and speaks his name again, the speech sample is compared to those stored by the scale until a match is found. If no match is found and the user spoke a name that has already been stored, the user is denied access or prompted to use another name. If no match is found and the user spoke a name that has not already been stored, the name and associated name print are stored.

Voice recognition has the additional benefit of serving as a form of password to prevent users from viewing other user's stored weight data.

In yet a further embodiment, the scale 72 comprises means for measuring the height of a user standing on the scale. The height measurement means comprises an ultrasonic (US) transmitter and receiver. The US transmitter generates a pulse which propagates upwards from the scale. In an initial calibration operation, a pulse or sequence of pulses are transmitted by the US transmitter, bounce off of the ceiling above the scale and are received by the US receiver in the scale. The round-trip travel time (i.e., the time between transmission and reception, referred to as tc) is measured and stored. In performing a height measurement with a user standing on the scale 72, a further pulse or sequence of pulses is transmitted upwards. The time (tm) required for the pulse(s) to travel from the scale 72 up to the ceiling, bounce off of the ceiling down to the top of the user's head, bounce off of the top of the user's head back up to the ceiling, and bounce off of the ceiling back down to the scale 72 is measured. The user's height can then be readily calculated as the distance traveled by the US pulse(s) in the time period tc-tm/2.

The devices described herein are meant to be exemplary of the present invention and not exhaustive. Other appliances or devices that may be adapted in accordance with the present invention include toasters, blenders, humidifiers, irons, microwave ovens, stoves, grills, refrigerators, dish washers, washers, dryers and air purifiers.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A food preparation system comprising:

a first programmable controller device having a first processor and a first power line interface coupled to the first processor and a power distribution system; and at least one programmable food preparation device having a second processor and a second power line interface coupled to the second processor and the power distribution system;

wherein the first programmable controller device and the at least one programmable food preparation device communicate with each other, under the control of the first and second processors, via the power distribution system and the first and second power line interfaces; and wherein the first programmable controller device may program the at least one programmable food preparation device to operate in accordance with food preparation parameters programmed in the first programmable controller, wherein the food preparation parameters include at least one of a recipe, a recipe modification, a desired time of food preparation completion, and a modification to the desired time of food preparation completion.

2. The system of claim 1, wherein the first programmable controller includes a network communications interface coupled to the first processor and to a communications network, and the first programmable controller may transmit and receive programming communications via one of the communications network by the network communications interface and the power distribution system by the power line interface.

3. The system of claim 2, the system further comprising a second programmable controller device having a third processor and a third power line interface coupled to the third processor and the power distribution system;

wherein the second programmable controller device communicates with the first programmable controller and the at least one programmable food preparation device, under the control of the first, second and third processors, via the power distribution system and the first, second and third power line interfaces; and wherein the first and second programmable controller devices may program each other and the at least one programmable food preparation device.

4. The system of claim 3, wherein the second programmable controller includes a second network communications interface coupled to the third processor and to the communications network, and the second programmable controller may transmit and receive programming communications via one of the communications network by the second network communications interface and the power distribution system by the third power line interface.

5. The system of claim 4, wherein the first programmable controller device includes a kitchen console and the second programmable controller device includes one of a personal computer and an alarm clock.

6. The system of claim 1, wherein the at least one programmable food preparation device includes at least one of a breadmaker, a coffee maker, a slow cooker, a steamer and a rice cooker.

7. The system of claim 6, wherein the steamer and the rice cooker are combined to create a rice cooker/steamer combination.

8. The system of claim 6, wherein the at least one programmable food preparation device includes a control panel, heating control and monitoring circuitry, and at least one condition sensor coupled to the second processor.

9. The system of claim 8, wherein the at least one condition sensor includes at least one of a temperature sensor, a liquid sensor, a weight sensor, a torque sensor, and a lid sensor.

10. A food preparation appliance comprising:

a processor;

a power line interface coupled to the processor and coupleable to a power distribution system;

a control panel coupled to the processor;

at least one food preparation compartment for preparing food;

a heater coupled to the processor and in thermal conductive contact with the at least one food preparation compartment;

at least one condition sensor coupled to the processor; and a housing containing the processor, the power line interface, the control panel, the at least one food preparation compartment, the heater, and the at least one condition sensor;

wherein the processor may communicate via the power line interface when coupled to the power distribution system; the control panel programs and interacts with the processor; the processor controls and monitors the heater; the heater heats the at least one food preparation compartment; the processor monitors the at least one condition sensor; and the at least one condition sensor detects at least one condition associated with one of the at least one food preparation compartment, the ingredients, and the housing.

11. The appliance of claim 10, wherein the food preparation appliance comprises one of a breadmaker, a coffee maker, a slow cooker, a steamer and a rice cooker.

12. The appliance of claim 11, wherein the steamer and the rice cooker are combined to create a rice cooker/steamer combination.

13. The appliance of claim 10, wherein the at least one condition sensor includes at least one of a temperature sensor, a liquid sensor, a wight sensor, a torque sensor, and a lid sensor.

14. The appliance of claim 10, further comprising a motor coupled to the processor and contained in the housing; and a stirring attachment removably attached to the motor and extending into the at least one food preparation compartment;

wherein the processor controls and monitors the motor; the motor rotates the stirring attachment; and the stirring attachment agitates ingredients within the at least one food preparation compartment.

15. A method of preparing food comprising selecting a recipe to be prepared and a desired time of food preparation completion;

programming the recipe and the desired time of food preparation completion into a programmable controller device;

receiving instructions from the programmable controller regarding preparation of ingredients for use in the recipe;

executing the instructions regarding the preparation of the ingredients;

placing the ingredients into at least one food preparation appliance having a processor in communication with the programmable controller device;

notifying the programmable controller device of the execution of the instructions regarding the preparation of the ingredients and of the placement of the ingredients into the at least one food preparation appliance;

activating the programmable controller device to execute aspects of the programming of the recipe and the desired time of food preparation completion that involve operating the at least one food preparation appliance containing the ingredients; and allowing the programmable controller device to operate the at least one food preparation appliance so that the food preparation is completed at the desired time of food preparation completion.

16. The method of claim 15, wherein the programmable controller device electronically receives the recipe and the instructions from one of an attached electronic data storage medium, a removable electronic data storage medium, a personal digital assistant, a locally networked personal computer, and a remotely networked computer.

17. The method of claim 15, wherein the programmable controller device electronically receives the desired time of food preparation completion from at least one of a control panel, an audible communication, a telephonic communication, an electronic communication, a wireless communication, and an internal algorithmic computation.

18. The method of claim 17, wherein the electronic communication is one of an e-mail message, a signal from an alarm clock in communication with the programmable controller device, a direct network communication from a local computer, and a direct network communication from a remote computer.

19. The method of claim 15, wherein the programmable controller device is one of a kitchen console, an alarm clock, a personal digital assistant, and a personal computer, and the at least one food preparation appliance is at least one of a breadmaker, a coffee maker, a slow cooker, a steamer and a rice cooker.

* * * * *